(12) United States Patent
Marinier et al.

(10) Patent No.: US 11,778,598 B2
(45) Date of Patent: Oct. 3, 2023

(54) FRAMING, SCHEDULING, AND SYNCHRONIZATION IN WIRELESS SYSTEMS

(71) Applicant: InterDigital Patent Holdings, Inc., Wilmington, DE (US)

(72) Inventors: Paul Marinier, Brossard (CA); Ghyslain Pelletier, Montreal (CA); Benoit Pelletier, Roxboro (CA); Moon-il Lee, Melville, NY (US); Marian Rudolf, Montreal (CA); Diana Pani, Montreal (CA)

(73) Assignee: InterDigital Patent Holdings, Inc., Wilmington, DE (US)

(*) Notice: Subject to any disclaimer, the term of this patent is extended or adjusted under 35 U.S.C. 154(b) by 102 days.

(21) Appl. No.: 17/341,919

(22) Filed: Jun. 8, 2021

(65) Prior Publication Data

US 2021/0298060 A1    Sep. 23, 2021

Related U.S. Application Data

(63) Continuation of application No. 16/837,358, filed on Apr. 1, 2020, now Pat. No. 11,528,701, which is a
(Continued)

(51) Int. Cl.
*H04W 72/0446* (2023.01)
*H04L 5/00* (2006.01)
(Continued)

(52) U.S. Cl.
CPC ....... *H04W 72/0446* (2013.01); *H04L 1/1819* (2013.01); *H04L 1/1896* (2013.01);
(Continued)

(58) Field of Classification Search
CPC ............. H04W 56/001; H04W 56/003; H04W 72/042; H04W 72/0446; H04W 72/0453;
(Continued)

(56) References Cited

U.S. PATENT DOCUMENTS

| 8,457,079 B2 | 6/2013 | Krishnamurthy et al. |
| 9,042,277 B2 | 5/2015 | Wanshi et al. |

(Continued)

FOREIGN PATENT DOCUMENTS

| CN | 103124207 A | 5/2013 |
| CN | 104125187 A | 10/2014 |

(Continued)

OTHER PUBLICATIONS

Ford et al., "Achieving Ultra-Low Latency in 5G Millimeter Wave Cellular Networks," Networking and Internet Architecture, arXiv:1602.06925v1 (Feb. 2016).
(Continued)

*Primary Examiner* — Gary Mui
(74) *Attorney, Agent, or Firm* — Flaster Greenberg, P.C.

(57) ABSTRACT

A WTRU may receive downlink control information (DCI) indicating a start of a frame. The DCI may be received on a control channel, such as the Physical Downlink Control Channel (PDCCH) from an eNB, base station, AP, or other infrastructure equipment operating in a wireless communications system. The WTRU may decode the DCI and may determine a transmit time interval (TTI) duration, which may be expressed in terms of an integer number of basic time intervals (BTIs). The WTRU may determine a downlink (DL) transmission portion and assignment and an uplink (UL) transmission portion and UL grant based on the received DCI. Additionally, the WTRU may determine the start of the UL portion based on an offset ($t_{offset}$). The WTRU may receive data in a DL portion of the frame and may
(Continued)

transmit in an UL portion of the frame based on the determined UL grant and TTI duration.

8 Claims, 12 Drawing Sheets

Related U.S. Application Data continuation of application No. 15/753,894, filed as application No. PCT/US2016/048548 on Aug. 25, 2016, now Pat. No. 10,616,886.

(60) Provisional application No. 62/273,245, filed on Dec. 30, 2015, provisional application No. 62/254,916, filed on Nov. 13, 2015, provisional application No. 62/250,840, filed on Nov. 4, 2015, provisional application No. 62/209,665, filed on Aug. 25, 2015.

(51) Int. Cl.

| | | |
|---|---|---|
| *H04W 56/00* | (2009.01) | |
| *H04L 1/1867* | (2023.01) | |
| *H04W 72/0453* | (2023.01) | |
| *H04W 72/23* | (2023.01) | |
| *H04L 1/1812* | (2023.01) | |
| *H04W 72/12* | (2023.01) | |

(52) U.S. Cl.
CPC .......... *H04L 5/0053* (2013.01); *H04L 5/0092* (2013.01); *H04W 56/001* (2013.01); *H04W 56/003* (2013.01); *H04W 72/0453* (2013.01); *H04W 72/12* (2013.01); *H04W 72/23* (2023.01); *H04L 5/0007* (2013.01); *H04L 5/0055* (2013.01)

(58) Field of Classification Search
CPC .. H04W 72/12; H04W 72/1289; H04L 5/007; H04L 5/0053; H04L 5/0055; H04L 1/1819; H04L 1/1896
See application file for complete search history.

(56) References Cited

U.S. PATENT DOCUMENTS

| | | | |
|---|---|---|---|
| 9,094,966 | B2 | 7/2015 | Kim et al. |
| 9,295,043 | B2 | 3/2016 | Papasakellariou et al. |
| 9,515,795 | B2 | 12/2016 | Bao et al. |
| 9,629,138 | B2 | 4/2017 | Wang et al. |
| 2009/0245190 | A1 | 10/2009 | Higuchi et al. |
| 2011/0075624 | A1 | 3/2011 | Papasakellariou et al. |
| 2011/0176461 | A1 | 7/2011 | Astely et al. |
| 2012/0257552 | A1 | 10/2012 | Chen et al. |
| 2013/0044651 | A1 | 2/2013 | Wang et al. |
| 2013/0188516 | A1 | 7/2013 | He et al. |
| 2013/0258975 | A1 | 10/2013 | Krishnamurthy et al. |
| 2013/0286960 | A1 | 10/2013 | Li et al. |
| 2013/0286970 | A1 | 10/2013 | Wang et al. |
| 2014/0036828 | A1 | 2/2014 | Papasakellarious et al. |
| 2014/0050192 | A1 | 2/2014 | Kim et al. |
| 2014/0056243 | A1* | 2/2014 | Pelletier .............. H04W 72/042 370/329 |
| 2014/0071954 | A1 | 3/2014 | Au et al. |
| 2014/0146799 | A1 | 5/2014 | Park et al. |
| 2014/0169312 | A1 | 6/2014 | Wang et al. |
| 2014/0321406 | A1 | 10/2014 | Marinier et al. |
| 2015/0085788 | A1 | 3/2015 | Kim et al. |
| 2015/0110016 | A1 | 4/2015 | Kim et al. |
| 2015/0156764 | A1 | 6/2015 | Yang et al. |
| 2015/0256313 | A1 | 9/2015 | Kim et al. |
| 2016/0080133 | A1 | 3/2016 | Golitschek Edler von Elbwart et al. |
| 2016/0087744 | A1 | 3/2016 | El Ayach et al. |
| 2016/0105570 | A1 | 4/2016 | Katoh |
| 2016/0262101 | A1 | 9/2016 | Nammi et al. |
| 2016/0295630 | A1* | 10/2016 | Gubeskys ............ H04B 7/0456 |
| 2017/0164350 | A1 | 6/2017 | Sun et al. |
| 2017/0238272 | A1* | 8/2017 | You .................... H04L 5/001 370/350 |
| 2017/0303219 | A1* | 10/2017 | Liu ..................... H04L 5/0032 |
| 2017/0367058 | A1 | 12/2017 | Pelletier et al. |
| 2018/0020462 | A1* | 1/2018 | Xiong .............. H04W 72/1215 |
| 2018/0199314 | A1 | 7/2018 | Takeda et al. |
| 2018/0249399 | A1 | 8/2018 | Takeda et al. |
| 2018/0331816 | A1 | 11/2018 | Harada et al. |
| 2018/0332605 | A1 | 11/2018 | Pelletier |
| 2019/0007181 | A1 | 1/2019 | Marinier et al. |

FOREIGN PATENT DOCUMENTS

| | | |
|---|---|---|
| EP | 2 750 429 | 7/2014 |
| EP | 2 802 091 | 11/2014 |
| JP | 2014511092 A | 5/2014 |
| KR | 2014-0071479 A | 6/2014 |
| RU | 2502192 C1 | 12/2013 |
| RU | 2537844 C2 | 1/2015 |
| WO | WO 2013/026418 A1 | 2/2013 |
| WO | 2013/086164 | 6/2013 |
| WO | WO 2015/0103383 A1 | 4/2015 |
| WO | 2015103383 A1 | 7/2015 |
| WO | 2016/036111 | 3/2016 |
| WO | 2016/036158 | 3/2016 |
| WO | 2016/105570 | 6/2016 |
| WO | 2016105570 A1 | 6/2016 |

OTHER PUBLICATIONS

Huawei et al., "Control signaling enhancements for short TTI," 3GPP TSG RAN WG1 Meeting #83, R1-156461, Anaheim, USA (Nov. 15-22, 2015).

Levanen et al., "Low Latency Radio Interface for 5G Flexible TDD Local Area Communications," 2014 IEEE International Conference on Communications Workshops (ICC) (Jun. 10-14, 2014).

Third Generation Partnership Project, "Technical Specification Group Radio Access Network; Study on New Radio (NR) Access Technology Physical Layer Aspects (Release 15)," 3GPP TR 38.802 V0.0.3 (Mar. 2016).

Third Generation Partnership Project, "Technical Specification Group Radio Access Network; Evolved Universal Terrestrial Radio Access (E-UTRA) and Evolved Universal Terrestrial Radio Access Network (E-UTRAN);Overall description; Stage 2 (Release 12)," 3GPP TS 36.300 V12.5.0 (Mar. 2015).

Third Generation Partnership Project, "Technical Specification Group Radio Access Network; Evolved Universal Terrestrial Radio Access (E-UTRA); Physical layer procedures (Release 12)," 3GPP TS 36.213 V12.6.0 (Jun. 2015).

Third Generation Partnership Project, "Technical Specification Group Radio Access Network; Evolved Universal Terrestrial Radio Access (E-UTRA); Medium Access Control (MAC) protocol specification (Release 12)," 3GPP TS 36.321 V12.6.0 (Jun. 2015).

Third Generation Partnership Project, "Technical Specification Group Radio Access Network; Evolved Universal Terrestrial Radio Access (E-UTRA); Medium Access Control (MAC) protocol specification (Release 12)," 3GPP TS 36.321 V12.9.0 (Mar. 2016).

Third Generation Partnership Project, "Technical Specification Group Radio Access Network; Evolved Universal Terrestrial Radio Access (E-UTRA); Radio Resource Control (RRC); Protocol specification (Release 12)," 3GPP TS 36.331 V12.6.0 (Jun. 2015).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; State 2 (Release 12)," 3GPP TS 36.300 V12.10.0 (Jun. 2016).

Third Generation Partnership Project, Technical Specification Group Radio Access Network; Evolved Universal Terrestrial Radio Access (E-UTRA) and Evolved Universal Terrestrial Radio Access Network (E-UTRAN); Overall description; State 2 (Release 13)3GPP TS 36.300 V13.4.0 (Jun. 2016).

(56) References Cited

OTHER PUBLICATIONS

Third Generation Partnership Project, "Technical Specification Group Radio Access Network; Evolved Universal Terrestrial Radio Access (E-UTRA); Physical layer procedures (Release 13)," 3GPP TS 36.213 V13.2.0 (Jun. 2016).

Third Generation Partnership Project, Technical Specification Group Radio Access Network; Evolved Universal Terrestrial Radio Access (E-UTRA); Physical layer procedures (Release 12)3GPP TS 36.213 V12.10.0 (Jun. 2016).

Third Generation Partnership Project, "Technical Specification Group Radio Access Network; Evolved Universal Terrestrial Radio Access (E-UTRA); Medium Access Control (MAC) protocol specification (Release 13)," 3GPP TS 36.321 V13.2.0 (Jun. 2016).

Third Generation Partnership Project, "Technical Specification Group Radio Access Network; Evolved Universal Terrestrial Radio Access (E-UTRA); Radio Resource Control (RRC); Protocol specification (Release 13)," 3GPP TS 36.331 V13.2.0 (Jun. 2016).

Third Generation Partnership Project, "Technical Specification Group Radio Access Network; Evolved Universal Terrestrial Radio Access (E-UTRA); Radio Resource Control (RRC); Protocol specification (Release 12)," 3GPP TS 36.331 V12.10.0 (Jun. 2016).

Third Generation Partnership Project, "Technical Specification Group Radio Access Network; Evolved Universal Terrestrial Radio Access (E-UTRA); Physical channels and modulation (Release 12)," 3GPP TS 36.211 V12.6.0 (Jun. 2015).

Third Generation Partnership Project, "Technical Specification Group Radio Access Network; Evolved Universal Terrestrial Radio Access (E-UTRA); Physical channels and modulation (Release 12)," 3GPP TS 36.211 V12.8.0 (Dec. 2015).

Third Generation Partnership Project, "Technical Specification Group Radio Access Network; Evolved Universal Terrestrial Radio Access (E-UTRA); Multiplexing and channel coding (Release 12)," 3GPP TS 36.212 V12.5.0 (Jun. 2015).

Third Generation Partnership Project, "Technical Specification Group Radio Access Network; Evolved Universal Terrestrial Radio Access (E-UTRA); Multiplexing and channel coding (Release 12)," 3GPP TS 36.212 V12.8.0 (Mar. 2016).

Third Generation Partnership Project, "Technical Specification Group Radio Access Network; Evolved Universal Terrestrial Radio Access (E-UTRA); Multiplexing and channel coding (Release 13)," 3GPP TS 36.212 V13.2.0 (Jun. 2016).

Third Generation Partnership Project, "Technical Specification Group Radio Access Network; Evolved Universal Terrestrial Radio Access (E-UTRA); Physical layer; Measurements (Release 12)," 3GPP TS 36.214 V12.2.0 (Mar. 2015).

Third Generation Partnership Project, "Technical Specification Group Radio Access Network; Evolved Universal Terrestrial Radio Access (E-UTRA); Physical layer; Measurements (Release 13)," 3GPP TS 36.214 V13.2.0 (Jun. 2016).

Third Generation Partnership Project, "Technical Specification Group Radio Access Network; Evolved Universal Terrestrial Radio Access (E-UTRA); Physical channels and modulation (Release 13)," 3GPP TS 36.211 V13.2.0 (Jun. 2016).

* cited by examiner

FRAMING, SCHEDULING, AND SYNCHRONIZATION IN WIRELESS SYSTEMS

CROSS REFERENCE TO RELATED APPLICATIONS

This application is a continuation of the U.S. patent application Ser. No. 16/837,358 filed on Apr. 1, 2020, which is a continuation of the U.S. patent application Ser. No. 15/753,894 filed on Feb. 20, 2018, which is a continuation of the U.S. National Stage, under 35 U.S.C. § 371, of International Application No. PCT/US2016/048548 filed Aug. 25, 2016, which claims the benefit of U.S. Provisional Application Ser. No. 62/209,665 filed Aug. 25, 2015, U.S. Provisional Application Ser. No. 62/250,840 filed Nov. 4, 2015, U.S. Provisional Application Ser. No. 62/254,916 filed Nov. 13, 2015, and U.S. Provisional Application Ser. No. 62/273,245 filed Dec. 30, 2015, the contents of which are hereby incorporated by reference herein.

BACKGROUND

Mobile communications technology is in continuous evolution and has already arrived at the doorstep of its fifth incarnation—5G. As with previous generations, new use cases largely contribute to setting the requirements for the new generation.

It is expected that the 5G air interface may enable such use cases as improved broadband performance (IBB), massive broadband (e.g. 1 ms transmit time intervals (ills), ultra-low latency (e.g. ~125 μs), ultra-reliable transmissions (e.g. single TTI vs. multi-TTI scheduling), low power node transmissions such as device-to-device (D2D) and vehicular applications (V2X), industrial control and communications (ICC), and massive machine-type communications (mMTC).

SUMMARY

Various approaches for flexible and variable framing are disclosed. In some embodiments, frame structures and timing for variable frame structures are determined. Synchronization and frame timing for a flexible frame structure are acquired. Scheduling and link adaptation are performed. The scheduling and link adaptation may be based on two instances of downlink control information (DCI).

A WTRU may receive a DCI indicating a start of a frame. The DCI may be received on a control channel such as the Physical Downlink Control Channel (PDCCH) from an eNB, base station, AP, or other infrastructure equipment operating in a wireless communications system. The WTRU may decode the DCI and may determine a transmit time interval (TTI) duration, which may be expressed in terms of an integer number of basic time intervals (BTIs). The WTRU may determine a downlink (DL) transmission portion and assignment and an uplink (UL) transmission portion and UL grant based on the received DCI. Additionally, the WTRU may determine the start of the UL portion based on an offset ($t_{offset}$). The WTRU may receive data in a DL portion of the frame and may transmit in an UL portion of the frame based on the determined UL grant and TTI duration.

BRIEF DESCRIPTION OF THE DRAWINGS

A more detailed understanding may be had from the following description, given by way of example in conjunction with the accompanying drawings wherein.

DETAILED DESCRIPTION

Figure 1A:
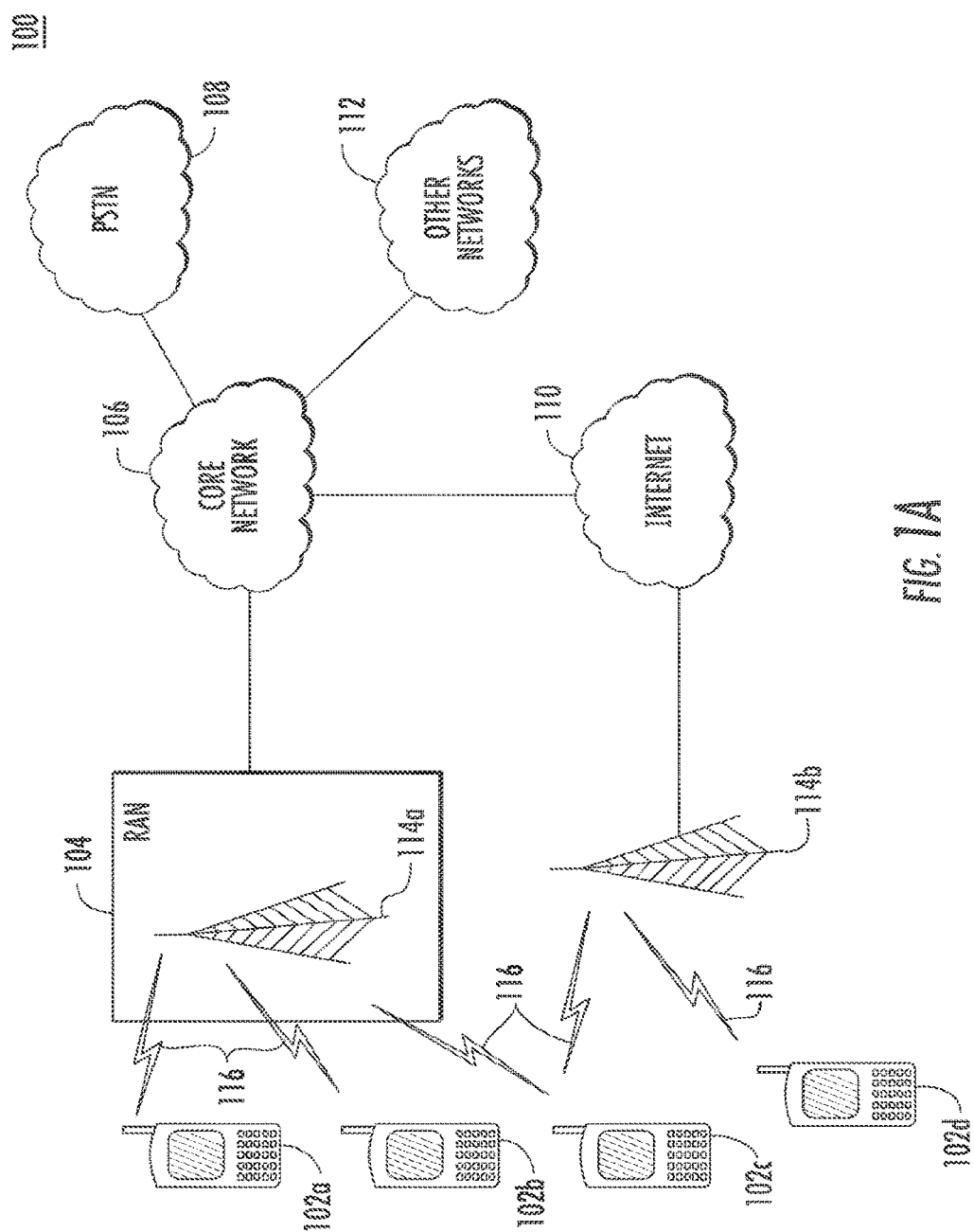
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B (eNB), a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
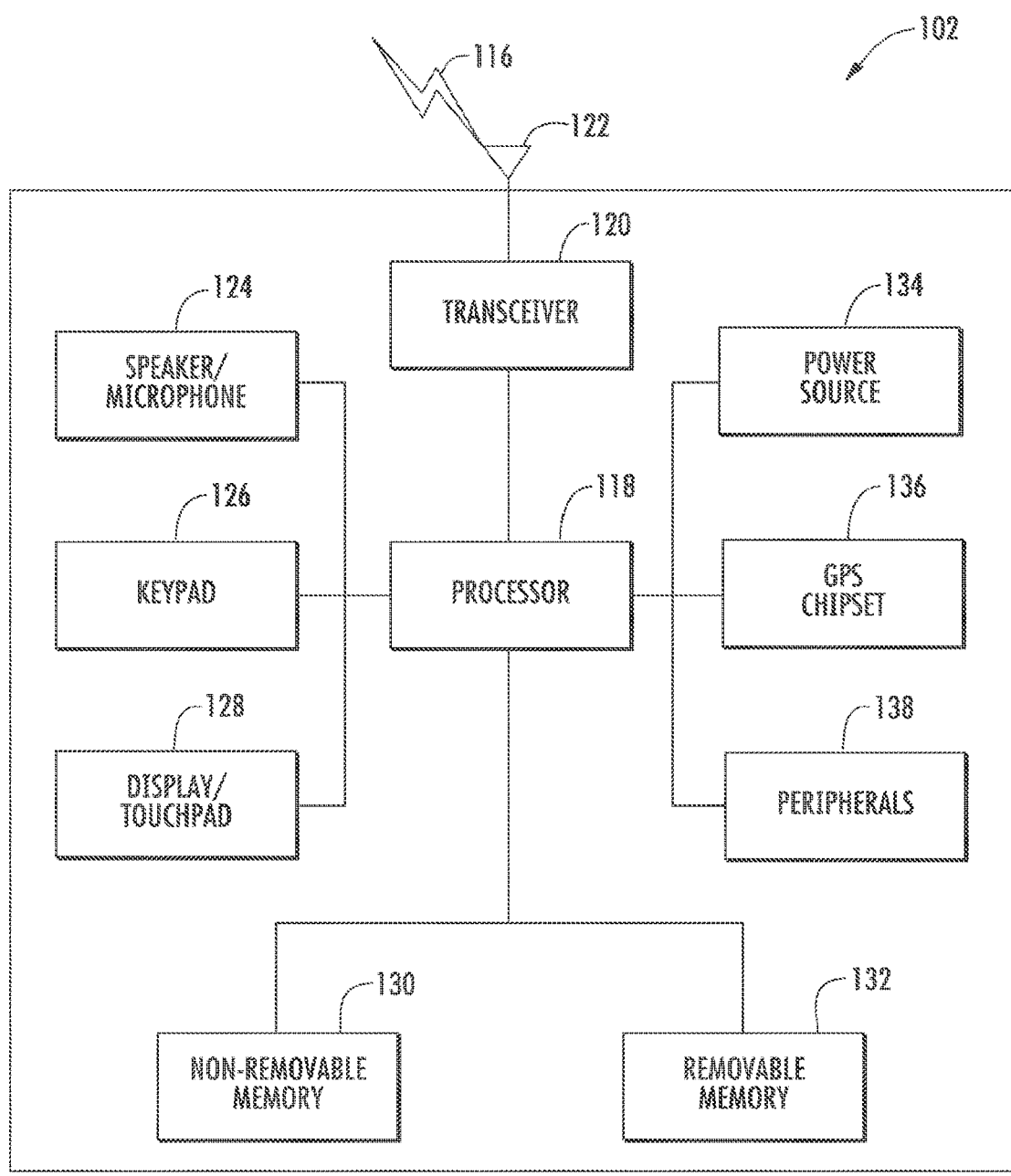
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
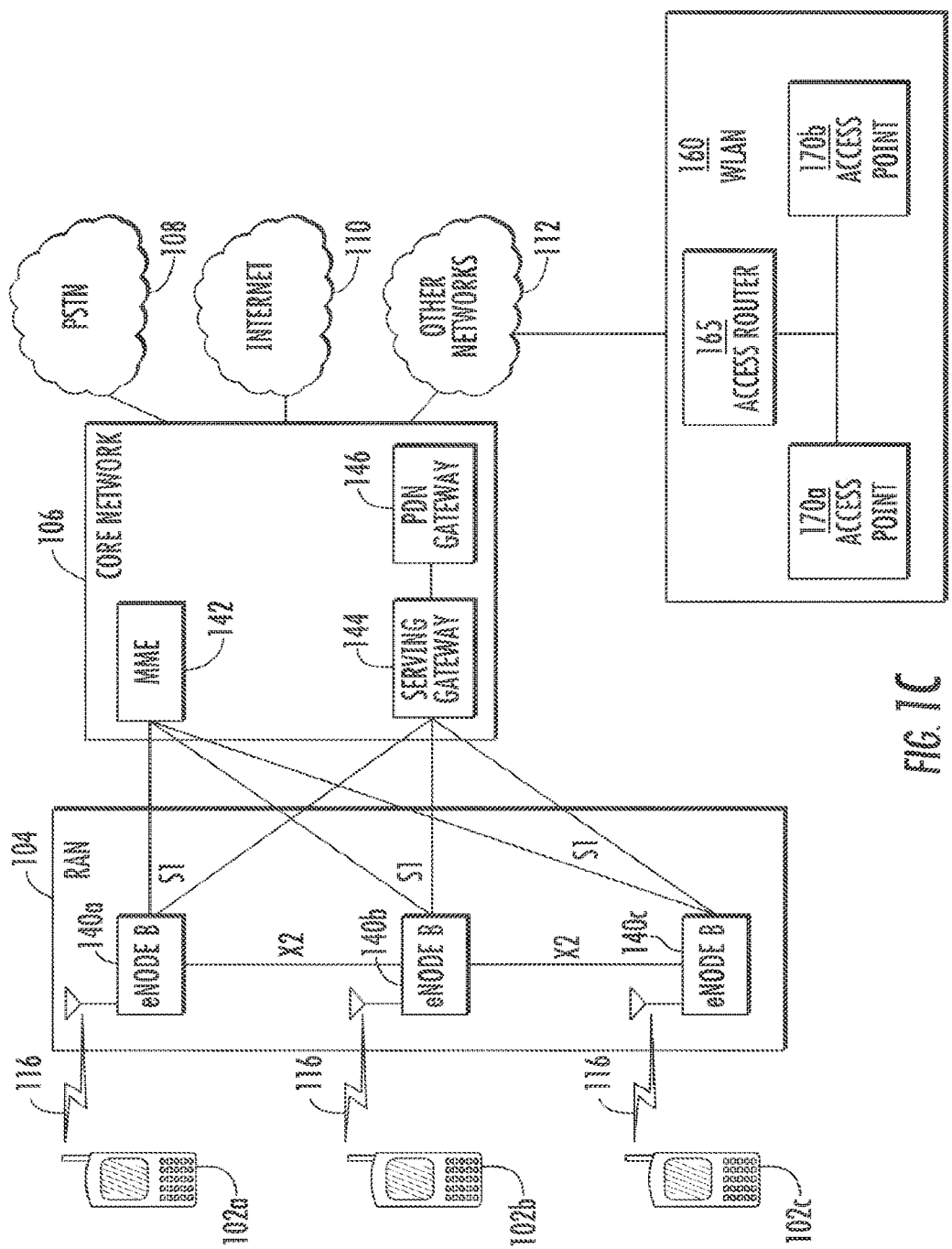
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode Bs (eNBs) 140a, 140b, 140c, though it will be appreciated that the RAN 104 may include any number of eNode Bs while remaining consistent with an embodiment. The eNode Bs 140a, 140b, 140c may each include one or more transceivers for communicating with the WTRUs 102a, 102b, 102c over the air interface 116. In one embodiment, the eNode Bs 140a, 140b, 140c may implement MIMO technology. Thus, the eNode B 140a, for example, may use multiple antennas to transmit wireless signals to, and receive wireless signals from, the WTRU 102a.

Each of the eNode Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode Bs 140a, 140b, 140c may communicate with one another over an X2 interface.

The core network 106 shown in FIG. 1C may include a mobility management entity gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Other network 112 may further be connected to an IEEE 802.11 based wireless local area network (WLAN) 160. The WLAN 160 may include an access router 165. The access router may contain gateway functionality. The access router 165 may be in communication with a plurality of access points (APs) 170a, 170b. The communication between access router 165 and APs 170a, 170b may be via wired Ethernet (IEEE 802.3 standards), or any type of wireless communication protocol. AP 170a is in wireless communication over an air interface with WTRU 102d.

The following abbreviations and acronyms are used herein:

$\Delta f$ Sub-carrier spacing
5gFlex 5G Flexible Radio Access Technology
5gNB 5GFlex NodeB
ACK Acknowledgement
BLER Block Error Rate
BTI Basic TI (in integer multiple of one or more symbol duration)
CB Contention-Based (e.g., access, channel, resource)
CoMP Coordinated Multi-Point transmission/reception
CP Cyclic Prefix
CP-OFDM Conventional OFDM (relying on cyclic prefix)
CQI Channel Quality Indicator
CN Core Network (e.g., LTE packet core)
CRC Cyclic Redundancy Check
CSI Channel State Information
D2D Device to Device transmissions (e.g., LTE Sidelink)
DCI Downlink Control Information
DL Downlink
DM-RS Demodulation Reference Signal
DRB Data Radio Bearer
EPC Evolved Packet Core
FBMC Filtered Band Multi-Carrier
FBMC/OQAM A FBMC technique using Offset Quadrature Amplitude Modulation
FDD Frequency Division Duplexing
FDM Frequency Division Multiplexing
ICC Industrial Control and Communications
ICIC Inter-Cell Interference Cancellation
IP Internet Protocol
LAA License Assisted Access
LBT Listen-Before-Talk
LCH Logical Channel
LCP Logical Channel Prioritization
LTE Long Term Evolution e.g., from 3GPP LTE R8 and up
MAC Medium Access Control
NACK Negative ACK
MC MultiCarrier
MCS Modulation and Coding Scheme
MIMO Multiple Input Multiple Output
MTC Machine-Type Communications
NAS Non-Access Stratum
OFDM Orthogonal Frequency-Division Multiplexing
OOB Out-Of-Band (emissions)
Pcmax Total available UE power in a given TI
PHY Physical Layer
PRACH Physical Random Access Channel
PDU Protocol Data Unit
PER Packet Error Rate
PLR Packet Loss Rate
QoS Quality of Service (from the physical layer perspective)
RAB Radio Access Bearer
RACH Random Access Channel (or procedure)
RF Radio Front end
RNTI Radio Network Identifier
RRC Radio Resource Control
RRM Radio Resource Management
RS Reference Signal
RTT Round-Trip Time
SCMA Single Carrier Multiple Access
SDU Service Data Unit
SOM Spectrum Operation Mode
SS Synchronization Signal
SRB Signalling Radio Bearer
SWG Switching Gap (in a self-contained subframe)
TB Transport Block
TDD Time-Division Duplexing
TDM Time-Division Multiplexing
TI Time Interval (in integer multiple of one or more BTI)
TTI Transmission Time Interval (in integer multiple of one or more TI)
TRx Transceiver
UFMC Universal Filtered Multi-Carrier
UF-OFDM Universal Filtered OFDM
UL Uplink
V2V Vehicle to vehicle communications
V2X Vehicular communications
WLAN Wireless Local Area Networks and related technologies (IEEE 802.xx domain)

Mobile communications technology is in continuous evolution and has arrived at its fifth incarnation—5G. As with previous generations, new use cases largely contributed to setting the requirements for the new generation. The 5G air interface may enable use cases including but not limited to the following: improved broadband performance (IBB), industrial control and communications (ICC), vehicular applications (V2X), and massive machine-type communications (mMTC). Such use cases may engender certain requirements for the 5G interface, including but not limited to support for baseband filtering of the frequency-domain waveform, support for ultra-low transmission latency, support for ultra-reliable transmission, and support for MTC operation (including narrowband operation).

Support for baseband filtering of the frequency-domain waveform may involve several design considerations. For example, such design considerations may include capabilities for baseband filtering of the frequency-domain waveform to enable effective aggregation of spectrum, (e.g., up to 150-200 MHz total spectrum within a given RF transceiver path) without relying on a re-design of the front end.

Aggregation of spectrum across widely separated operating bands (e.g., 900 MHz and 3.5 GHz) may utilize multiple RF transceiver chains based on due to antenna size requirements and amplifier optimization design constraints. For example, a WTRU implementation may include three separate RF transceiver paths: a first RF transceiver path below 1 GHz, a second RF transceiver path for the 1.8-3.5 GHz frequency range, and a third RF transceiver path covering the 4-6 GHz frequency range. Native built-in support for Massive MIMO antenna configurations may also be a second order requirement.

Various use cases (e.g., IBB) may require that multiple frequency bands with spectra of varying sizes be efficiently aggregated to achieve data rates (e.g., on the order of several tens of Mbps (cell edge) up to peak data rates of several Gbps (e.g., up to 8 Gbps) with typical rates in the order of several hundreds of Mbps.)

Support for ultra-low transmission latency may also relate to several design considerations. For example, air interface latency as low as 1 ms RTT may require support for TTIs somewhere between 100 µs and (no larger than) 250 µs.

Support for ultra-low access latency (e.g., time from initial system access until the completion of the transmission of the first user plane data unit) may also be of interest. For example, IC and V2X may require a particular end-to-end (e2e) latency. Such e2e latency may be less than 10 ms.

Support for ultra-reliable transmission may also involve several design considerations. One such design consideration may include transmission reliability that is significantly better than what is currently possible with legacy LTE systems. For example, a target transmission reliability rate may be 99.999% transmission success and service availability. Another consideration may be support for mobility for speed in the range of 0-500 km/h. For example, IC and V2X may require a specific Packet Loss Rate. Such packet loss ratio may be less than $10e^{-6}$.

Support for MTC operation (including narrowband operation) may involve several design considerations. For example, the air interface may be required to efficiently support narrowband operation (e.g., operation using less than 200 KHz bandwidth), may require extended battery life (e.g., up to 15 years of autonomy), and may require minimal communication overhead for small and infrequent data transmissions (e.g., low data rates in the range of 1-100 kbps with access latency of seconds to hours).

Support for an mMTC use case may require narrowband operation. The resulting link budget may be required to be comparable to that of LTE extended coverage while supporting a very large number of MTC devices (up to 200 k/km$^2$) without adverse impact on spectral efficiency for other supported services.

The example requirements described above may in turn relate to the following design aspects:

The 5G system design may enable flexible spectrum usage, deployment strategies, and operation. The design may support operation using spectrum blocks or spectra of varying sizes, including aggregation of non-adjacent carriers in the same and/or in different frequency bands, licensed or unlicensed. The system may also support narrowband and wideband operation, different duplexing methods (and, for TDD, dynamically variable DL/UL allocation), variable TTIs lengths, scheduled and unscheduled transmissions, synchronous and asynchronous transmissions, separation of user plane from the control plane, and multi-node connectivity.

The 5G system design may integrate with a number of legacy (E-)UTRAN and EPC/CN aspects. Although there may be no requirement for backward compatibility, the system may be expected to integrate and/or operate with legacy interfaces (or evolutions thereof). For example, the system may be backward compatible at least towards a legacy CN (e.g., the S1 interface, NAS) and eNBs (e.g., the X2 interface including dual connectivity with LTE) as well as to enable legacy aspects such as support for existing QoS and security mechanisms. In addition, other functionality supported by legacy systems may be considered. For example, D2D/Sidelink operation, LAA operation using LBT, and relaying may be supported.

A number of basic principles may underlie a flexible radio access system for 5G (5gFLEX). OFDM is used as the basic signal format for data transmissions in both LTE and in IEEE 802.11. OFDM efficiently divides the spectrum into multiple parallel orthogonal subbands. Each subcarrier may be shaped using a rectangular window in the time domain leading to sinc-shaped subcarriers in the frequency domain. OFDMA thus may require perfect frequency synchronization and tight management of uplink (UL) timing alignment within the duration of a cyclic prefix to maintain orthogonality between signals and to minimize inter-carrier interference. Such synchronization may also not be well-suited in a system where a WTRU is connected to multiple access points simultaneously. Additional power reduction is also typically applied to uplink transmissions to comply with out-of-band (OOB) emission or spectral emission requirements (e.g., to adjacent bands), in particular in the presence of aggregation of fragmented spectrum for the WTRU's transmissions.

Some of the shortcomings of conventional OFDM (CP-OFDM) may be addressed by more stringent RF requirements for implementations, especially when operating using a large amount of contiguous spectrum not requiring aggregation. A CP-based OFDM transmission scheme may also lead to a downlink physical layer for 5G similar to that of legacy system (e.g., mainly modifications to pilot signal density and location).

Accordingly, the 5gFLEX design may focus on other waveform candidates, although conventional OFDM remains a possible candidate for 5G systems, at least for the downlink (DL) transmission scheme. Building upon basic technologies already known from conventional OFDMA and legacy LTE systems, various principles behind the design of flexible radio access for 5G are discussed further herein.

The 5gFLEX downlink transmission scheme may be based on a multicarrier waveform, which may be characterized by high spectral containment (i.e. lower side lobes and lower OOB emissions). In particular, possible MC waveform candidates for 5G include OFDM-OQAM and UFMC (UF-OFDM). Multicarrier modulation waveforms may divide the channel into subchannels and modulate data symbols on subcarriers in these subchannels.

With OFDM-OQAM, a filter may be applied in the time domain per subcarrier to the OFDM signal to reduce OOB. OFDM-OQAM may cause very low interference to adjacent bands, may not need large guard bands and may not require a cyclic prefix. OFDM-OQAM may be the most popular FBMC technique. However, OFDM-OQAM may be sensitive to multipath effects and to high delay spread in terms of orthogonality thereby complicating equalization and channel estimation.

With UFMC (UF-OFDM), a filter also may be applied in the time domain to the OFDM signal to reduce OOB. However, filtering may be applied per subband to use spectrum fragments thereby potentially reducing complexity and making UF-OFDM somewhat more practical to implement. However, if there are one or more unused spectrum fragments in the band, OOB emissions in these fragments may remain as high as in conventional OFDM. In other words, UF-OFDM may improve over OFDM at the edges of the filtered spectrum only, and not in the spectral hole.

Methods described herein are not limited to the above waveforms and may be applicable to other waveforms. The waveforms above will be further used herein for exemplary purposes.

Such waveforms may enable frequency multiplexing of signals with non-orthogonal characteristics (such as different subcarrier spacing) and co-existence of asynchronous signals without requiring complex interference cancellation receivers. Such waveforms may also facilitate aggregation of fragmented pieces of spectrum in the baseband processing as a lower cost alternative to implementing such aggregation as part of the RF processing.

Coexistence of different waveforms within the same band may be used for example to support mMTC narrowband operation (e.g., using SCMA.) Another example may include supporting the combination of different waveforms within the same band (e.g., CP-OFDM, OFDM-OQAM and UF-OFDM for all aspects and for both downlink and uplink transmissions.)

The 5gFLEX uplink transmission scheme may use a same or different waveform as for downlink transmissions. Multiplexing of transmissions to and from different WTRUs in the same cell may be based on FDMA and TDMA.

The methods, devices, and systems described herein may be particularly applicable to 5G systems as well as to evolutions of other existing systems such as LTE systems, or evolutions of other wireless technologies, such as HSPA, WiFi/IEEE 802.11, or the like. For example some of the proposed methods, devices, and systems may be backward compatible with existing technologies. For example, ills shorter than a LTE slot (0.5 ms) using a different waveform to enable ultra-low latency may be supported. Operating the 5G physical layer (DL and/or UL) in TDM and/or in FDM with LTE may also be supported.

The 5gFLEX radio access design may be characterized by a very high degree of spectrum flexibility which enables deployment in different frequency bands with different characteristics, including different duplex arrangements and different and/or variable sizes of the available spectrum including contiguous and non-contiguous spectrum allocations in the same or different bands. The 5gFLEX radio access design may also support variable timing aspects, including support for multiple TTI lengths and support for asynchronous transmissions.

Both TDD and FDD duplexing schemes may be supported in 5gFLEX. For FDD operation, supplemental downlink operation may be supported using spectrum aggregation. FDD operation may support both full-duplex FDD and half-duplex FDD operation. For TDD operation, the DL/UL allocation may dynamic i.e., it may not be based on a fixed DL/UL frame configuration; rather, the length of a DL or a UL transmission interval may be set per transmission opportunity.

The 5gFLEX design allows for different transmission bandwidths on both uplink and downlink, ranging from anything between a nominal system bandwidth up to a maximum value corresponding to the system bandwidth.

Figure 2:
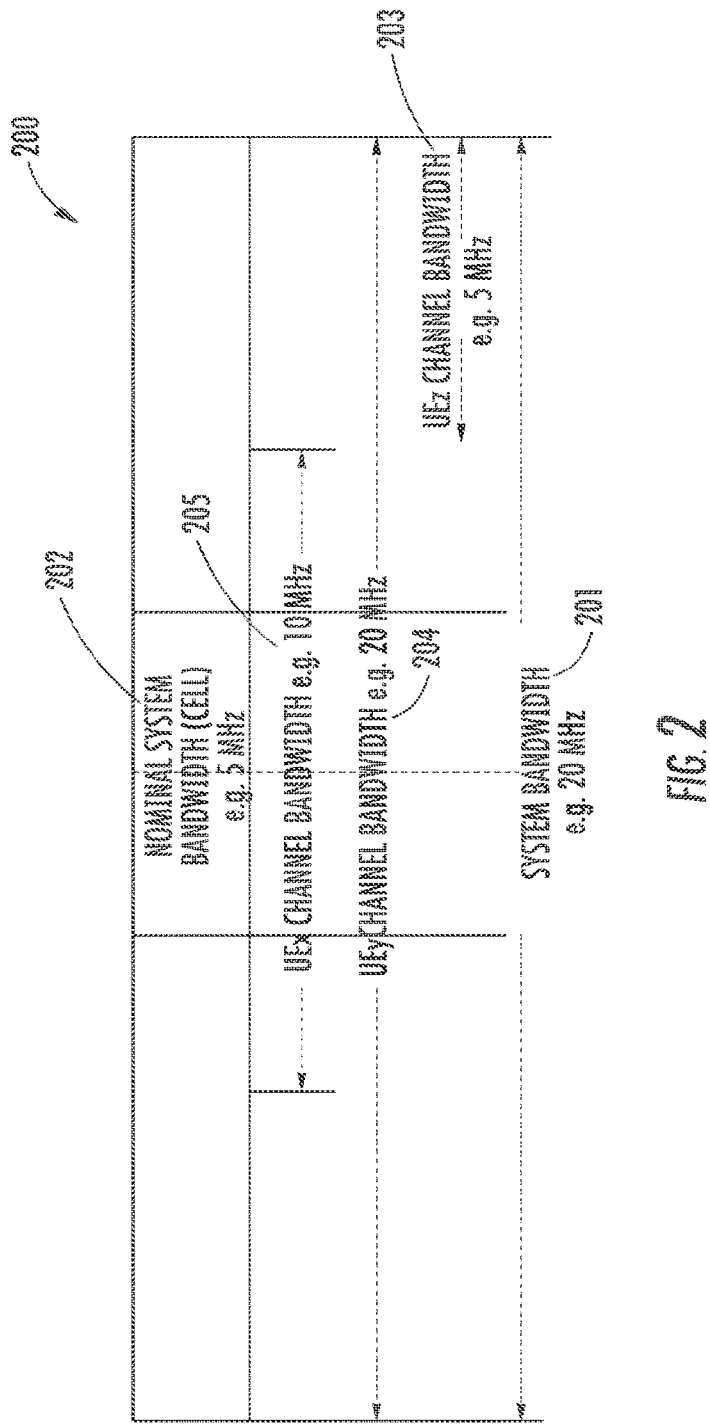
FIG. 2 is a diagram that provides an example of some of the supported system transmission bandwidths.

FIG. 2 is a diagram that provides an example of some of the system transmission bandwidths supported by an example 5gFLEX system 200. For single carrier operation, supported system bandwidths may include at least 5, 10, 20, 40 and 80 MHz. In some embodiments, supported system bandwidths may include any bandwidth in a given range (e.g., from a few MHz up to 160 MHz). Nominal bandwidths may have one or more fixed possible values. Support for 160 MHz and for the nominal system bandwidth (e.g., 5 MHz) may also be possible. Narrowband transmissions of up to 200 KHz may be supported within the operating bandwidth for MTC devices. It is noted that system bandwidth 201, as used herein, may refer to the largest portion of spectrum that may be managed by the network for a given carrier. For such a carrier, the portion of spectrum that a WTRU minimally supports for cell acquisition, measurements, and initial access to the network may be referred to herein as the nominal system bandwidth 202. The WTRU may be configured with a channel bandwidth 203, 204, and 205 that is within the range of the entire system bandwidth. The WTRU's configured channel bandwidth 203, 204, and 205 may or may not include the nominal system bandwidth 202 part of the system bandwidth 201. Bandwidth flexibility may be achieved because all applicable sets of RF requirements for a given maximum operating bandwidth in a band may be met without the introduction of additional allowed channel bandwidths for that operating band due to the efficient support of baseband filtering of the frequency domain waveform.

A WTRU's channel bandwidth for single carrier operation may be configured, reconfigured, and/or dynamically changed, and spectrum for narrowband transmissions within the nominal system, system or configured channel bandwidth may be allocated.

The 5gFLEX physical layer may be band-agnostic and may support operation in licensed bands (e.g., below 5 GHz) as well as operation in unlicensed bands (e.g., in the range 5-6 GHz). For operation in such unlicensed bands, LBT Cat 4 based channel access framework similar to LTE LAA may be supported.

Cell-specific and/or WTRU-specific channel bandwidths for arbitrary spectrum block sizes may also be scaled and managed (e.g., scheduling, addressing of resources, broadcasted signals, measurements).

5gFLEX may support flexible spectrum allocation as described herein. Downlink control channels and signals may support FDM operation. A WTRU may acquire a downlink carrier by receiving transmissions using only the nominal part of the system bandwidth. In other words, the WTRU may not initially need to receive transmissions covering the entire bandwidth that is being managed by the network for the particular carrier.

Downlink data channels may be allocated over a bandwidth that may or may not correspond to the nominal system bandwidth, without restrictions, other than being within the WTRU's configured channel bandwidth. For example, the network may operate a carrier with a 12 MHz system bandwidth using a 5 MHz nominal bandwidth allowing devices supporting at most 5 MHz maximum RF bandwidth to acquire and access the system while possibly allocating +10 to −10 MHz of the carrier frequency to other WTRU's supporting up to 20 MHz worth of channel bandwidth.

Figure 3:
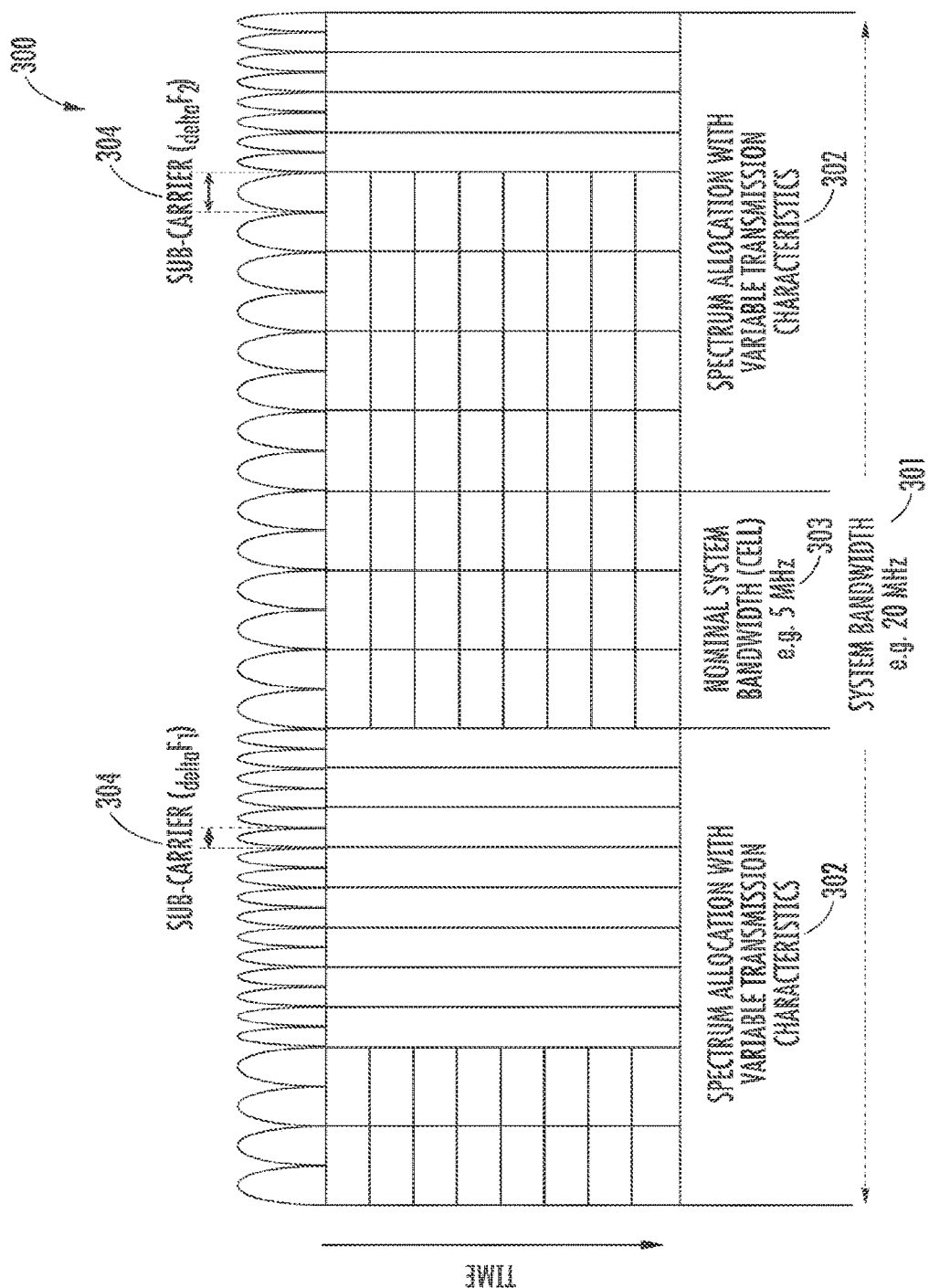
FIG. 3 is a diagram of an example flexible spectrum allocation.

FIG. 3 is a diagram of an example flexible spectrum allocation 300. The system bandwidth 301 may support spectrum allocation with variable transmission characteristics 302 and the nominal system bandwidth 303. In the example of FIG. 3, the different subcarriers 304 may be at least conceptually assigned to different modes of operation (e.g., spectrum operation mode (SOM)). Different SOM may be used to fulfill different requirements for different transmissions. A SOM may include a subcarrier spacing, a TTI length, and/or one or more reliability aspects (e.g., hybrid automatic repeat request (HARQ) processing aspects) and possibly also a secondary control channel. SOM may refer to a specific waveform or to a processing aspect (e.g., support for co-existence of different waveforms in the same carrier using FDM and/or TDM, or support for coexistence of FDD operation in a TDD band in a TDM manner or otherwise).

The WTRU may be configured to perform transmissions according to one or more SOMs. For example, a SOM may correspond to transmissions that use at least one of the following: a specific TTI duration, a specific initial power level, a specific HARQ processing type, a specific upper bound for successful HARQ reception/transmission, a specific transmission mode, a specific physical channel (uplink or downlink), a specific waveform type, or a transmission according to a specific RAT (e.g., legacy LTE or according to a 5G transmission method). A SOM may correspond to a QoS level and/or related aspect e.g., maximum/target latency, maximum/target BLER or similar. A SOM may correspond to a spectrum area and/or to a specific control channel or aspect thereof (including search space, DCI type, etc).

Spectrum aggregation may be supported for single carrier operation. In spectrum aggregation, the WTRU may support transmission and reception of multiple transport blocks over contiguous or non-contiguous sets of physical resource blocks (PRBs) within the same operating band. A single transport block may also be mapped to separate sets of PRBs.

Simultaneous transmissions may be associated with different SOM requirements. Multicarrier operation may also be supported using contiguous or non-contiguous spectrum blocks within the same operating band, or across two or more operating bands. Aggregation of spectrum blocks using different modes (e.g., FDD and TDD) and using different channel access methods (e.g., licensed and unlicensed band operation below 6 GHz) may also be supported. The WTRU's multicarrier aggregation may be configured, reconfigured, or dynamically changed.

Efficient baseband filtering in the frequency domain may have the advantage of permitting high-flexibility spectrum aggregation and support for additional channels or band combinations without requiring RF specification work.

A scheduling function may be supported in the MAC layer. Scheduling modes including but not limited to the following may be supported: network-based scheduling for tight scheduling in terms of resources, timing and transmission parameters of downlink transmissions and/or uplink transmissions, and WTRU-based scheduling for more flexibility in terms of timing and transmission parameters. For both modes, scheduling information may be valid for a single or for multiple TTIs.

Network-based scheduling may enable the network to tightly manage available radio resources assigned to different WTRUs, such as to optimize the sharing of such resources. Such network-based scheduling may be dynamic.

WTRU-based scheduling may enable the WTRU to opportunistically access uplink resources with minimal latency on a per-need basis within a set of shared or dedicated uplink resources assigned (dynamically or not) by the network. Both synchronized and unsynchronized opportunistic transmissions may be supported, and both contention-based transmissions and contention-free transmissions may be supported.

Support for opportunistic transmissions (scheduled or unscheduled) may have the advantage of meeting ultra-low latency requirements for 5G and power saving requirements of the mMTC use case.

Flexible framing may be used in wireless communications systems such as a 5gFLEX system for downlink and uplink transmissions. Downlink and uplink transmissions may be organized into radio frames characterized by a number of fixed aspects (e.g., location of downlink control information) and a number of varying aspects (e.g., transmission timing, supported types of transmissions). One or more of such aspects may differ in terms of the radio frame arrangement between different types of transmissions, between transmissions of the same WTRU (e.g., spectrum operation mode (SOM)-specific framing structure), between transmissions of different WTRUs (e.g., WTRU-specific framing structure), and between transmissions in the downlink direction and in the uplink direction. The timing relationships supported by the flexible frame structure may be indicated to the WTRU dynamically or semi-statically as shown in the examples described herein.

A transmission time interval (TTI) may be the minimum time supported by the system between consecutive transmissions where each transmission may be associated with different transport blocks (TBs) for the downlink ($TTI_{DL}$) and for the uplink (UL TRx), excluding any preamble (if applicable), but including any control information (e.g., downlink control information (DCI) or uplink control information (UCI)). A TTI may be expressed in terms of an integer number of one or more basic time intervals (BTIs).

A BTI may be expressed in terms of an integer number of one or more symbol(s), where symbol duration may be a function of the subcarrier spacing applicable to the time-frequency resource. For FDD, subcarrier spacing may thus differ between the uplink carrier frequency $f_{UL}$ and the downlink carrier frequency $f_{DL}$ for a given frame. A BTI may also be expressed in terms of a legacy timing structure such as a legacy TTI.

Supported frame durations may include, for example, at least 100 µs, 125 µs (⅛ ms), 142.85 µs (1/7 ms is 2 LTE OFDM symbols with normal cyclic prefix) and 1 ms to enable alignment with the legacy LTE timing structure.

Figure 4:
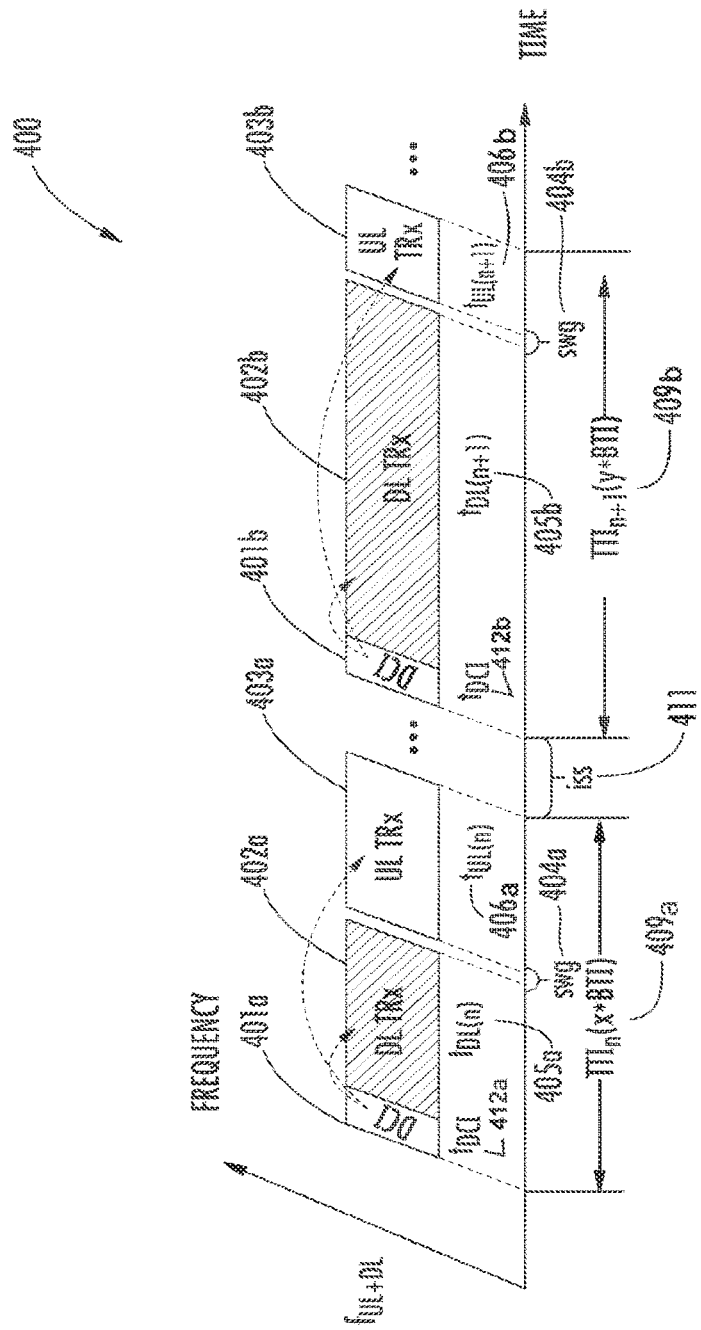
FIG. 4 is a diagram of an example flexible frame structure for TDD that may be used in a wireless communications system such as a 5gFLEX system.

FIG. 4 is a diagram of an example flexible frame structure 400 for TDD that may be used in a wireless communications system such as a 5gFLEX system in accordance with one embodiment, which may be used in combination with any of the embodiments described herein. As shown in the example of FIG. 4, the start of each frame may be indicated by a downlink control information (DCI) 401a and 401b of a fixed time duration $t_{dci}$ 412a and 412b preceding any DL transmission portion of each frame (DL TRx) 402a and 402b for the concerned carrier frequency, $f_{UL+DL}$. The duration of the DL transmission portions 402a and 402b may be based on an integer number of transmit blocks (TBs).

In the example of FIG. 4, the DCI 401a may indicate at least duration $t_{DL(n)}$ 405a for the DL TRx portion 402a for frame n, and DCI 401b may indicate at least duration $t_{DL(n+1)}$ 405b for the DL TRx portion 402b for frame n+1, in addition to any downlink assignment(s) and/or any uplink grant(s) indicated by the DCIs 401a and 401b.

The frame may also include an UL transmission portion of the frame (UL TRx) 403a and 403b. The duration of the UL transmission portions 403a and 403b may be based on an integer number of transmit blocks (TBs). In the example of FIG. 4, the DCI 401a may indicate at least duration $t_{UL(n)}$ 406a for the UL TRx portion 403a for frame n, and DCI 401b may indicate at least duration $t_{UL(n+1)}$ 406b for the UL TRx portion 403b for frame n+1. If the uplink portion of the frame is present as shown in the example of FIG. 4, a switching gap (SWG) 404a and 404b may precede the uplink portion of each frame.

The WTRU may then derive the resulting TTI duration for each frame based on the DCIs 401a and 401b. As shown in the example of FIG. 4, the variable duration of each frame may be expressed in terms of a TTI duration expressed in terms of an integer number of BTIs. In the example of FIG. 4, the duration of frame n is expressed in terms of a $TTI_n$ expressed as x*BTI 409a, and the duration of frame n+1 is expressed in terms of a $TTI_{n+1}$ expressed as y*BTI 409b. The example of FIG. 4 also shows the inter-subframe spacing (ISS) 411.

For TDD, 5gFLEX may support Sidelink operation for purposes of device-to-device (D2D) or vehicle-to-everything (V2X) communication in the frame structure 400 by including respective downlink control and forward direction transmissions in the DCI and DL TRx portion (if a semi-static allocation of the respective resources is used). Alternatively, Sidelink operation for purposes of D2D or V2X communication may be supported in the frame structure 400 by including respective downlink control and forward direction transmissions in the DL TRx portion only (for dynamic allocation). The respective reverse direction transmission for Sidelink operation for purposes of D2D or V2X communication may be included in the UL TRx portion of the frame structure 400.

It is noted that the indication or configuration of $t_{DL}$ and/or $t_{UL}$ may correspond to a setting where the DL TRx and/or UL TRx portion are not present. This may be useful for a case where either DL only or UL only transmissions are scheduled.

Figure 5:
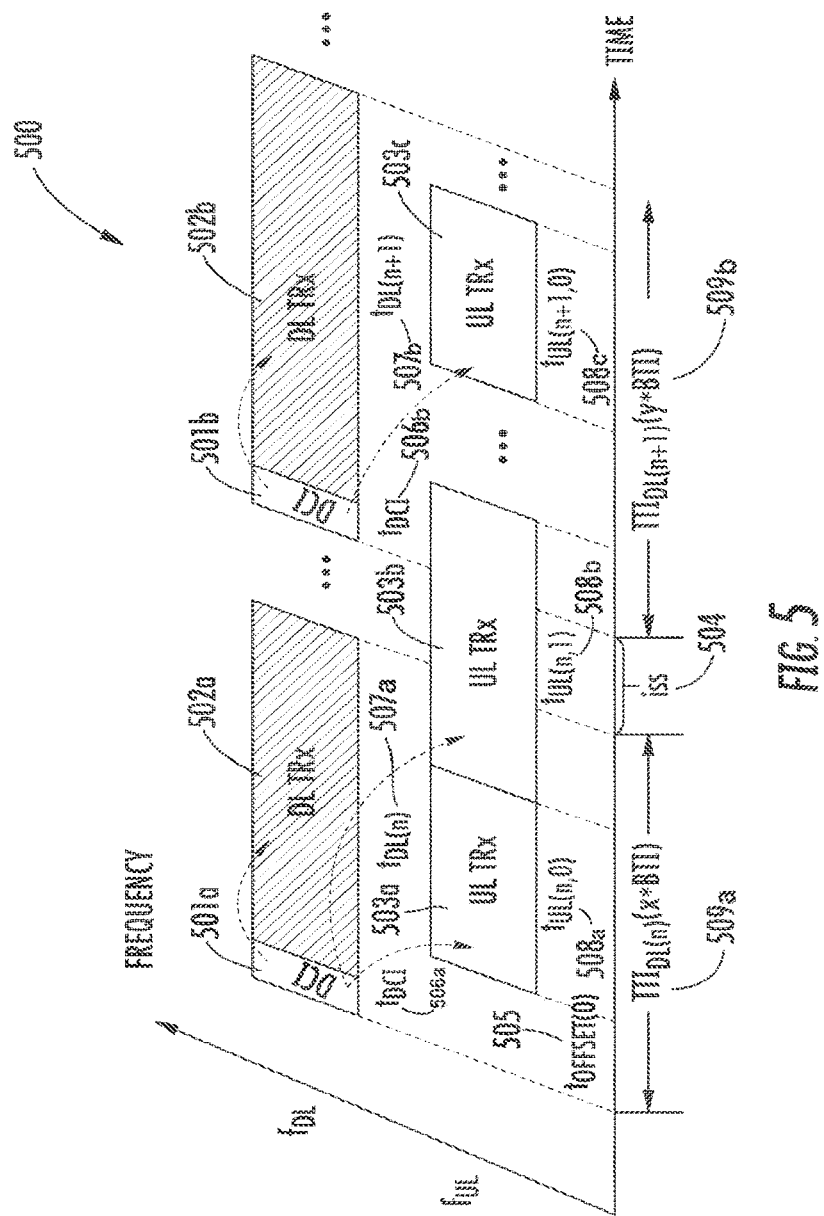
FIG. 5 is a diagram of an example frame structure for FDD that may be used in a wireless communications system such as a 5gFLEX system.

FIG. 5 is a diagram of an example frame structure 500 for FDD that may be used in a wireless communications system such as a 5gFLEX system in accordance with another embodiment, which may be used in combination with any of the embodiments described herein. The frame structure 500 may include a downlink reference TTI and one or more TTI(s) for the uplink. As shown in the example of FIG. 5, the start of the frame may be indicated by a DCI 501a and 501b of a fixed time duration $t_{dci}$ 506a and 506b preceding any downlink data transmission portion (DL TRx) 502a and 502b for the concerned carrier frequency $f_{DL}$. The duration of the DL transmission portions 502a and 502b may be based on an integer number of transmit blocks (TBs).

In the example of FIG. 5, the DCI 501a may indicate the TTI duration $t_{DL(n)}$ 507a for the DL TRx portion 502a for frame n, and DCI 501b may indicate the TTI duration for $t_{DL(n+1)}$ 507b for the DL TRx portion 502b for frame n+1. As shown in the example of FIG. 5, the variable duration of each frame may be expressed in terms of the downlink reference TTI durations expressed in terms of an integer number of BTIs. In the example of FIG. 5, the duration of frame n is expressed in terms of a $TTI_{DL(n)}$ expressed as x*BTI 509a, and the duration of frame n+1 is expressed in terms of a $TTI_{DL(n+1)}$ expressed as y*BTI 509b.

The DCI(s) may indicate an offset ($t_{offset}$) 505 and the TTI duration for any applicable uplink transmission(s) that contains a transport block. Separate DCIs may also be used for the downlink and uplink directions. In the example, of FIG. 5, the frame may include an uplink transmission portion (UL TRx) 503a, 503b, and 503c for the concerned carrier frequency $f_{UL}$. The duration of the UL transmission portions 503a, 503b, and 503c may be based on an integer number of transmit blocks (TBs). The start of an uplink TTI may be derived using the offset ($t_{offset}$) 505 applied from the start of the downlink reference frame that overlaps with the start of the uplink frame. The $t_{offset}$ 505 may include a timing advance, e.g., in cases where UL synchronization is applicable. In the example of FIG. 5, DCI 501a may indicate at least duration $t_{UL(n,0)}$ 508a and $t_{UL(n,1)}$ 508b for the UL TRx portions 503a and 503b for frame n. DCI 501b may indicate at least duration $t_{UL(n+1,0)}$ 508c for the UL TRx portion 503c for frame n+1. The example of FIG. 5 also shows the ISS 504.

For FDD, 5gFLEX may support Sidelink operation for purposes of D2D or V2X communication in the UL TRx portion of the frame structure 500 by including respective downlink control and forward direction and reverse direction transmissions in the UL TRx portion (dynamic allocation of the respective resources may be used).

The DL timing/resource for HARQ A/N using the frame structure 400 or 500 may also be determined for an uplink transmission. The timing between a data transmission and the corresponding HARQ A/N may be indicated explicitly or implicitly.

It is noted that the ISS may support asynchronous operation when the start of a frame is determined by detection of a preamble (e.g., for license-assisted access (LAA), massive machine-type-communication (mMTC), and low latency.) It is also noted that $t_{offset}$ may support processing delays in the range of Ops up to one or more ms. The $t_{offset}$ may support CP-OFDM based transmissions by additionally including timing advance (i.e., $t_{offset}$≥timing advance in such cases). The $t_{offset}$ may also support a synchronous DL/UL relationship if set to a value equal to the sum of a required processing delay and a required timing advance (Ops in cases where it is not needed for the applicable waveform). This may be the case for FDD operation given that it does not need to support Listen-before-talk (LBT) operation. The $t_{offset}$ may support asynchronous scheduling of uplink control information (UCI), if UCI is present at the beginning of the UL TRx portion or if scheduling of uplink control channels is supported.

Figure 6A:
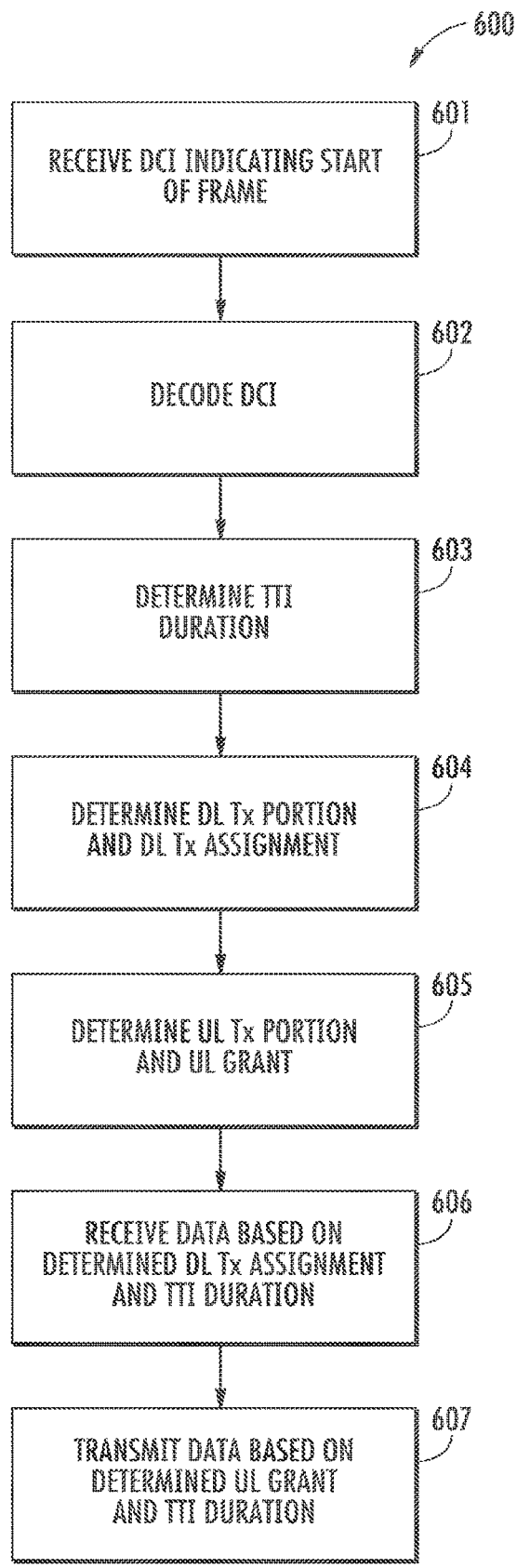
FIG. 6A is flow diagram of an example process for dynamically determining a structure and timing for a variable frame.

FIG. 6A is flow diagram of an example process for dynamically determining a structure and timing for a variable frame 600 as described above. While each step of the process 600 in FIG. 6A is shown and described separately, multiple steps may be executed in a different order than what is shown, in parallel with each other, or concurrently with each other. A WTRU, via the transceiver or receiver of the WTRU as described above, may receive a DCI 601 indicating a start of a frame. The DCI may be received on a control channel such as the Physical Downlink Control Channel (PDCCH) and from an eNB, base station, AP, or other infrastructure equipment operating in a wireless communications system. The WTRU may decode 602 the DCI. The WTRU may determine a TTI duration based on the received DCI 603. As described above, the TTI duration may be expressed in terms of an integer number of Hs. The WTRU may determine a DL transmission portion and DL transmission assignment 604 based on the received DCI. The WTRU may then determine an UL transmission portion and UL grant 605 based on the received DCI. Additionally, the WTRU may determine the start of the UL portion based on an offset ($t_{offset}$) that is indicated in the DCI. The WTRU, via the transceiver or receiver of the WTRU as described above, may receive data in the DL transmission portion of the frame based on the determined DL transmission assignment and TTI duration 606. The WTRU, via the transceiver or transmitter of the WTRU as described above, may transmit data in an UL transmission portion of the frame based on the determined UL grant and TTI duration 607.

Figure 6B:
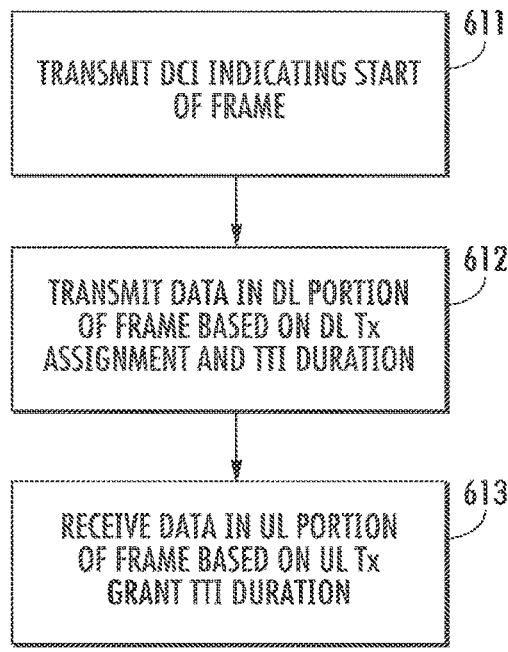
FIG. 6B is flow diagram of an example process for dynamically configuring a structure and timing for a variable frame.

FIG. 6B is flow diagram of an example process for dynamically configuring a structure and timing for a variable frame as described above. While each step of the process in FIG. 6B is shown and described separately, multiple steps may be executed in a different order than what is shown, in parallel with each other, or concurrently with each other. An eNB (or base station, AP, or other infrastructure equipment operating in a wireless communications system) via the transceiver or transmitter of the eNB as described above, may transmit a DCI 611 to a WTRU indicating a start of a frame. The DCI may be transmitted on a control channel such as the PDCCH. The transmitted DCI may enable the WTRU to determine a TTI duration based on the DCI. The transmitted DCI may enable the WTRU to determine a DL transmission portion and DL transmission assignment based on the DCI. The transmitted DCI may enable the WTRU to determine an UL transmission portion and UL grant based on the DCI. Additionally, the transmitted DCI may enable the WTRU to determine the start of the UL portion based on an offset ($t_{offset}$). The eNB, via the transceiver or transmitter of the eNB as described above, may transmit data to the WTRU in a DL portion of the frame based on the DL transmission assignment and TTI duration 612. The eNB, via the transceiver or receiver of the eNB as described above, may receive data in an UL portion of the frame based on the UL grant and TTI duration 613.

Figure 7:
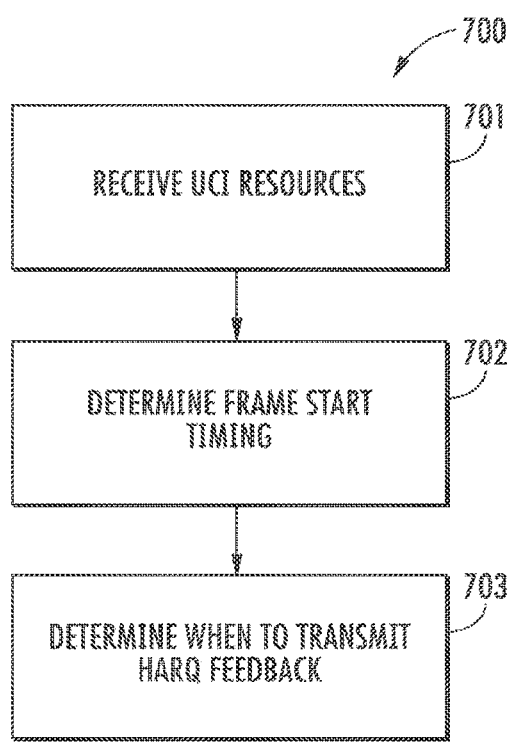
FIG. 7 is a flow diagram of an example transmission process for flexible framing.

FIG. 7 is a flow diagram of an example transmission process for flexible framing 700 that may be used in a wireless communications system such as a 5gFLEX system in accordance with one embodiment, which may be used in combination with any of the embodiments described herein. Referring to FIG. 7, if an Uplink Control Information (UCI) only is transmitted in the UL TRx portion, (e.g., in the absence of UL Transport Block(s) for a given WTRU), the WTRU may obtain or receive the UCI resources to be used 701 in the UL TRx portion. The WTRU may obtain or receive the UCI resources to be used 701 using one or a combination of several methods, including but not limited to the following:

(1) The allocated resources for UCI to be used by the WTRU may be derived from a configured set of resources. These allocated resources may be WTRU specific or may be associated with more than one WTRU.

(2) The UCI resources may be indicated to a WTRU by use of a DCI.

(3) The UCI resources to be used by a WTRU to transmit a UCI in the UL TRx portion may be determined by the WTRU as a function of the transmission parameters used for reception in a preceding DL TRx portion. In a first example, the frequency location and/or allocation bandwidth and/or transmission duration and/or encoding parameters of a data channel received by the WTRU in the DL TRx portion may be used by the WTRU to determine the transmission parameters for a corresponding UCI transmission in terms of frequency domain resources and encoding parameters in an UL TRx portion. In a second example, the WTRU may determine the UCI resources to be employed from the encoding parameters of a known signal sequence such as pilot symbols and/or patterns. Either one or a combination of two or more of the following parameters and/or other parameters may be used to generate such a known sequence by the WTRU in order to determine the UCI resources: frequency location(s), generating sequence of index identifier, sequence number, and frame number, symbol timing.

Referring to FIG. 7, the WTRU may then determine the frame start timing 702 (e.g., with respect to the beginning of a frame where the DCI may be decoded) using one or a combination of several methods, including but not limited to the following:

(1) The WTRU may determine the start of the transmission of a frame by measuring and determining the presence of a known signal sequence. The WTRU may search for known signal sequences in frequency and/or time from a set of candidate signal sequences. In one example, the known signal sequence may be or correspond to a set of fixed value symbols distributed in a frequency/time allocation grid at the beginning of a frame. In another embodiment, the known signal sequence may be or correspond to a preamble signal. Upon detection of the known signal sequence, the WTRU may determine a presence of DCI by deriving location and candidate occurrence positions in frequency and/or time as a function of the detected known signal sequence.

(2) A WTRU may determine the start of a frame by determining a presence or absence of a frame in a limited set of candidate positions in time. In a first exemplary embodiment, a frame may only start at time instants . . . 50, 100, 150, 200, . . . microseconds (μs), but not in-between. A WTRU, having determined DL timing from acquisition of DL common signals/channels, may therefore attempt to detect the possible start of a DL frame transmission only at these precisely known time instants. This solution may reduce detection complexity and/or increase detection reliability. In another example, the candidate time instants in which a frame transmission may start are determined by the WTRU as a function of another DL signal transmission. For example, a WTRU having acquired a DL reference signal, may determine possible start positions for frame transmissions as a function of the transmission parameters of the DL reference signal.

It is noted that timing parameters and start instants for frame transmissions may be WTRU specific, shared by a group of WTRUs, or be common to all WTRUs. Furthermore, different DL signals/channels may employ different configurations with respect to transmission timing and possible start instants. For example, a DL common control channel may use a start timing which is fixed and deterministic with respect to time. A DL data channel may use flexible start timing and occurrences as a function of the data available for scheduling.

Referring to FIG. 7, the WTRU may then determine when to transmit UL HARQ feedback 703 in order to support HARQ when transmitting and receiving using flexible framing. It is noted that HARQ feedback in the following may refer to Ack, Nack or DTX bit(s), or equivalent indexed mappings derived by a receiver following reception of Transport Block(s), individual or grouped bits or indices derived for either one or a plurality of HARQ processes. The WTRU may determine when to transmit UL HARQ feedback 703 using one or a combination of several methods, including but not limited to the following:

(1) The DL HARQ feedback for a TB received in the DL TRx portion may be sent by a WTRU in the immediately following UL TRx portion of the same frame.

(2) The DL HARQ feedback for a TB received in the DL TRx portion may be sent by the WTRU in a configurable UL TRx portion, where the configurable UL TRx portion may be another frame. The WTRU may determine in which UL TRx portion it transmits DL HARQ feedback from configured and/or signaled parameters. For example, the WTRU may determine that DL HARQ feedback for either one or a set of DL HARQ processes is to be transmitted in the UL TRx portion of every nth frame. Alternatively, the WTRU may determine that DL HARQ feedback corresponding to DL TRx in a frame is transmitted in the UL TRx portion of the next frame. In another example, the DL HARQ feedback corresponding to multiple received TBs in multiple Hs or TTIs may be aggregated by the WTRU in a first step, then transmitted by the WTRU in the UL TRx portion of a determined frame to the eNB. In such a case, the relationship between the DL TRx portions in which data was received by the WTRU and for which DL HARQ feedback is derived, and the UL TRx portion in which the aggregated multi-TTI HARQ feedback is transmitted to the eNB may be configured, may be given through a timing relationship, or may be determined from reception of a DL control signal or channel or its contents.

(3) The UL HARQ feedback corresponding to TB(s) transmitted by a WTRU in the UL TRx portion of frame may be transmitted by the eNB in the DL TRx portion of the next frame.

(4) The WTRU may determine which DL TRx portion and/or which frame may contain UL HARQ feedback corresponding to TB(s) transmitted by the WTRU in the UL TRx portion from configured and/or signaled parameters, or the WTRU may determine that UL HARQ feedback corresponding to UL TRx in a frame is transmitted in the DL TRx portion of a frame. In another example, the UL HARQ feedback corresponding to multiple received TBs in multiple BTIs or TTIs may be aggregated by the eNB in a first step, then transmitted to the WTRU in the DL TRx portion of a determined frame by the eNB. In such a case, the relationship between the UL TRX portions in which data was received by the eNB and for which UL HARQ feedback is derived, and the DL TRx portion in which the aggregated multi-TTI HARQ feedback is transmitted to the WTRU may be configured, given through a timing relationship, or announced to a WTRU by transmission of a DL control signal or channel or its contents.

(5) The WTRU may determine which DL TRx portion may contain UL HARQ feedback corresponding to preceding UL TB(s) from detection of a signal sequence and/or control signal. For example, the signal sequence may indicate that a HARQ feedback carrying a signal/channel is present in the DL TRx portion of a frame, or the signal sequence may correspond to a DCI or equivalent control signal indicating presence and/or identified recipients of HARQ feedback information. It is noted that the signal sequence or control signal announcing presence of HARQ feedback may be different from the signal sequence or control signal carrying HARQ feedback. Similarly, presence, receiver or process identities for HARQ feedback information may be decoded from either one or a combination of such a first and second signal.

(6) HARQ feedback corresponding to either a DL TRx or UL TRx portion may be transmitted using a non-5gFLEX carrier. For example, DL HARQ feedback corresponding to a DL data channel received by a WTRU in the DL TRx portion may be transmitted to the eNB using an UL 3G HSPA or 4G LTE channel. A WTRU, in a first step, may receive one or more TBs on a DL data channel using DL 5gFLEX. In a second step, the WTRU may determine the transmission instant and payload sequence for a 3G HSPA UL or 4G UL LTE control channel to transmit one or more DL HARQ feedback bits to the eNB using the 4G LTE UL. In one example, 4G LTE UL PUCCH may be employed in a 1 millisecond (ms) TTI interval to carry N=10 A/N bits corresponding to N=10 received 5gFLEX DL data channels. This illustrative example may also be applied to a 4G LTE UL PUSCH carrying HARQ feedback for DL 5gFLEX received DL data, or it can be employed when UL and DL directions are reversed, i.e., where the WTRU transmits UL 5gFLEX data in one or more frames in the UL TRx portion(s), and then receives HARQ feedback on either DL 3G HSPA or 4G LTE channel.

Various techniques may be used to determine of the timing of different types of transmissions and/or the timing of certain periods where no transmission occurs (i.e. transmission gaps). The expression "transmission type" may be used to refer to a transmission or transmission gap characterized by any combination of the following: a direction; a purpose associated to a transmission gap; whether the transmission is used to carry control information or data; whether the control information consists of a specific type of control; a type of signal; a type of physical channel; a service, SOM, quality of service (QoS) or purpose associated with the transmission; whether the transmission corresponds to a scheduled transmission or an unscheduled transmission; a given resource allocation in the frequency domain, or a given carrier; or a property associated to the transmission.

A direction may include downlink, uplink, sidelink transmission, or sidelink reception. A purpose associated with a transmission gap may include switching from DL to UL, inter-subframe spacing, measurement for CSI reporting or radio resource management, clear channel assessment. A specific type of control information may include as hybrid automatic repeat request (HARQ) feedback, channel state information (CSI), scheduling request (SR), frequency allocation, modulation and coding scheme (MCS), transport block size, precoding matrix information, and the like. A type of signal may include a type of reference signal such as a sounding reference signal, demodulation reference signal, CSI reference signal, or cell-specific reference signal; a synchronization signal; a preamble, midamble, or postamble. A type of physical channel may include a shared channel, dedicated channel or control channel. A service, SOM, quality of service (QoS) or purpose associated with the transmission may include whether the transmission is associated to ultra-low latency communication, ultra-reliable communication, mobile broadband, device-to-device communication, vehicle-to-everything communication, massive machine-type communication, and the like. A scheduled transmission may be network-controlled. An unscheduled transmission may be WTRU-initiated. A property associated with the transmission may include a modulation order, coding scheme, rank, sub-carrier spacing, symbol duration, coding rate, etc.

A given transmission type may occur in a single continuous period, or in multiple (discontinuous) periods. The possible durations for certain transmission types (e.g., data transmission) may be in multiples of BTIs. Multiple transmissions of same or different types may or may not be allowed to occur during a same period, depending on the duplexing scheme and WTRU capabilities.

Flexible DCI-to-transmission timing may be supported by using a variable time-offset (e.g., between DCI and transmission time) and/or multi-frame scheduling (e.g., DCI scheduling) in various embodiments. The WTRU may receive a DCI (e.g., DCI(t)) that is applicable at the start of a time period. Such a time period may be period t where t may be at least one of t=n, n+1, n+2, etc. Alternatively, t may represent an offset in time (e.g., a number of symbols, BTIs, etc.). Such DCI(t) may include a single value for t in the case of a single transmission period (e.g., TTI) allocation (e.g., resource allocation) or a plurality of values in the case of an allocation that may be available for a plurality of transmission periods (e.g., multiple TTIs). Such a plurality of transmission periods may be either consecutive (e.g., one or more values for t may represent a range including possibly a single value for t with an indication of a total number of occasions) or disjoint in time (e.g., one opportunity per value for t). For example, the WTRU may receive a DCI that indicates a plurality of transmissions using multiple values for t where each value may correspond to a transmission occasion for different HARQ processes (multi-process scheduling) and/or using a single value for t with an indication of a total number of transmission occasions for a single HARQ process (e.g., for bundling operation).

Transmissions may also be sequenced with variable timing. The timing of a transmission type may be sequence-based, e.g., may be determined based on a sequence of transmission types in a frame and a duration associated with each transmission type of the sequence. The start time for a given transmission type may then be determined as the sum of durations of earlier transmission types in the sequence. The duration of a transmission type may be fixed or may be dynamically determined based on any of the methods describes herein.

For example, the following sequence of transmission types may be configured: 1) downlink control information, 2) downlink data, 3) switching gap, 4) uplink data, and 5) uplink control information. In a particular frame, the durations of the "downlink control information" transmission and "downlink data" transmission may correspond to 1 BTI and 5 BTIs respectively. In this case, the start time of the "uplink data" transmission may be determined as 6 BTIs plus the duration of the switching gap, after the start of the frame.

Timing may be variable based on the transmission type. The timing of a transmission type may be constraint-based, e.g., may be a function of conditions and/or priorities associated with the transmission type. Such conditions may include but are not limited to the following examples: a set of allowed BTI(s) for the given transmission type, a delay or minimum delay between the transmission and an associated transmission (of possibly different type), a priority associated with the transmission type relative to other transmission types in cases where they cannot occur simultaneously, or a maximum duration associated with each transmission type.

A set of allowed BTI(s) for the given transmission type may include, for example, where transmission of uplink control information may be allowed only starting from the nth BTI following the start of the frame.

Examples of delay or minimum delay between the transmission and an associated transmission (of possibly different types) may include cases where transmission of a HARQ-ACK associated with a downlink data transmission may be allowed to occur only at least 1 BTI after the end of the downlink data transmission, plus possibly a duration corresponding to a timing advance and/or switching gap. Alternatively, delay or minimum delay between the transmission and an associated transmission may include cases where transmission of uplink data transmission may be allowed to occur only at least 1 BTI after the end of the physical downlink control channel indicating its parameters.

A priority associated with the transmission type relative to other transmission types in cases they cannot occur simultaneously may itself be timing-dependent. Such priorities may include but are not limited to the following examples: where transmission of certain types of uplink control information (e.g., HARQ-ACK) may have higher priority than other types (e.g., CSI); where transmission of uplink control information may have higher priority than transmission of uplink data or (in case of TDD or FDD half-duplex operation) reception of downlink data; where transmission of uplink data (or uplink control information) may be prioritized according to the associated SOM, (e.g., a transmission associated with an ultra-low latency SOM may have higher priority than a transmission associated to a mobile broadband SOM); and where transmission of HARQ-ACK associated to a first downlink data transmission may have higher priority than transmission of HARQ-ACK associated with a second downlink data transmission, if the first downlink data transmission started (or completed) earlier than the second downlink data transmission, at least in case the transmissions are associated to the same SOM.

According to the above principles, a transmission of a given type may be initiated (or continue) at the earliest BTI for which the transmission is allowed, if it satisfies any delay or minimum delay condition and/or if it is the highest priority transmission type that needs to be transmitted. In some cases, an on-going transmission may be interrupted in BTI(s) not satisfying the condition(s) and may resume in BTI(s) satisfying the condition(s). Alternatively, an on-going transmission may be stopped and cancelled if it is interrupted.

A wireless communications system such as a 5gFLEX system may use the various approaches for determining the timing parameters described herein and in combination with any of the embodiments described herein. For example, various approaches for obtaining at least one of the following parameters used for the determination of timing associated with a transmission type are discussed herein, including but not limited to the following examples: the start time, end time, and/or duration of the transmission (which may be derived, for example, from the associated frame/subframe duration), where it is understood that any one of these three parameters may be derived from the two others (i.e. duration=end time−start time; where the start time and end time may refer to the beginning of the frame or to another time reference); the start time, end time and/or duration of each continuous portion of the transmission and the number of portions, in cases where the transmission occurs discontinuously; the position of the transmission type in a sequence (if applicable); a set of allowed BTI(s) for the transmission type, if applicable (this may be referred to as a "frame structure"); a set of BTI(s) for which a priority between transmission type applies, if applicable; the applicability of constraint-based timing or sequence-based timing in a frame; the maximum duration of the transmission; or the start time of a frame. Frame (or subframe) "types" or "structures" may be defined to refer to specific combinations of values (or range thereof) for at least one of the above parameters. It is understood that the solutions are thus also applicable to the determination of frame (or subframe) types or structures.

By extension, these approaches may also be applied to indicate a subset of resources within a BTI associated with a transmission type when a same BTI is used for more than one transmission type (e.g., at the boundary between two transmission types). For example, a first subset of frequency resources within a BTI may be associated with a first TTI or transmission type, and a second subset of frequency resources within a BTI may be associated with a second TTI or transmission type.

At least one timing parameter may be pre-defined, configured by higher layers, or dependent on the duplex mode or on the WTRU capabilities. For example, the duration of a preamble signal may be pre-defined to be one BTI.

At least one timing parameter may be determined dynamically based on an implicit or explicit indication from downlink control information received at the beginning of the frame or in a previous frame. The indication may include a field of the downlink control information; a type of control physical channel; a search space and/or a time where the control physical channel is decoded; or an identifier used for determining the applicability of the control physical channel. The following are examples of such indications.

Downlink control information may indicate a first transmission of uplink data associated with a first SOM starting at an indicated time and of a first indicated duration, followed by a second transmission of uplink data associated with a second SOM starting immediately following the first transmission and of a second indicated duration.

Downlink control information may indicate the start time of the uplink transmission carrying HARQ-ACK information applicable to a specific downlink transmission (i.e. for a given carrier) and/or a subframe type.

The type of downlink physical control channel successfully decoded and/or a DCI format may determine the timing parameters of the downlink or uplink transmission(s) indicated by the control signaling. For example, successful decoding of a first type of physical control channel used for the purpose of indicating one or more transmission(s) associated to a first specific SOM (e.g., a SOM suitable for ultra-low latency communication) may implicitly indicate a first set of timing parameters associated to the one or more transmission(s) (and/or a first subframe type), while decoding of a second type of physical control channel used for the purpose of indicating one or more transmission(s) associated to a second specific SOM (e.g., a SOM suitable for mobile broadband communication) may implicitly indicate a second set of timing parameters (and/or a second subframe type).

Downlink control information may indicate a duration of a reference signal used in the downlink or the uplink, such as a demodulation reference signal or a sounding reference signal.

Downlink control information may indicate a number of TTIs and/or a set or number of HARQ processes for TTIs to be included within a certain time period, such as a subframe. The start time and end time of each TTI may then be implicitly derived from the number of available symbols (or BTIs) within the time period, possibly excluding any symbol or BTI utilized for the transmission of downlink control information (such as a control region in the case of an LTE-based transmission). For example, the start time and end time of each TTI may be set such that all TTIs within the subframe have the same duration, except possibly the last one. Additionally, the start time and end time of any TTI may be constrained such that the TTI is fully contained in a sub-unit of the time period, such as a slot of a subframe.

For example, downlink control information may indicate that 2 TTIs are transmitted in a subframe, or that 2 TTIs with HARQ processes 2 and 3 are transmitted in a subframe. In a case where a control region occupies 2 symbols and a subframe includes 14 symbols, this may implicitly indicate a first TTI starting at the third symbol and ending at the eighth symbol, and a second TTI starting at the ninth symbol and ending at the fourteenth symbol. Alternatively, in a case where each TTI is constrained within one slot, this may implicitly indicate a first TTI starting at the third symbol and ending at the seventh symbol, and a second TTI starting at the eighth symbol and ending at the fourteenth symbol.

Downlink control information may indicate a transport block size or a maximum transport block size for one or more TTIs to be included within a certain time period, such as a subframe. The start time and end time of each TTI may then be implicitly derived from a modulation and coding scheme (MCS) and a resource block (RB) allocation for which the transport block size would not exceed the indicated maximum transport block size. For example, for an indicated MCS, RB allocation and maximum transport block size, the WTRU may determine that the maximum number of symbols (or BTIs) is 3. The WTRU may determine the start and end time of each TTI based on this maximum according to principles similar to those described herein, e.g., in the previous example.

Timing parameters for a transmission type used for the provision of HARQ feedback information may be implicitly derived from the duration of a TTI for the corresponding transmission, or from a number of TTIs transmitted within a certain time period. For example, the number of transmissions carrying HARQ feedback within a certain time period (e.g., a subframe) may correspond to the number of TTIs within a subframe for the corresponding transmissions. For example, if transport blocks are transmitted in two TTIs within a subframe (e.g., over a PDSCH in the case of an LTE-based transmission), there may be two transmissions carrying HARQ feedback for these transport blocks within a subframe.

One or more timing parameters may be implicitly determined from a property associated with the transmission type. For example, timing information (e.g., at least the duration) of a demodulation reference signal may depend on the modulation and coding scheme and rank of the associated data or control transmission.

One or more timing parameters may be implicitly determined from a property of a signal received at the beginning of the frame or in a previous frame. For example, the sequence of transmission types may be a function of a sequence (such as a Zadoff-Chu root sequence or a cyclic shift of such sequence) used for generating a synchronization or reference signal received at the beginning of the frame or in a previous frame.

One or more timing parameters may be determined from the payload associated with a transmission type. For example, the duration of a transmission carrying HARQ-ACK may be a function of the number of bits of HARQ- ACK information to transmit. In another example, the duration of a transmission carrying downlink control information may be a function of the number of bits used to dynamically indicate a downlink or uplink data transmission.

One or more timing parameters may be determined from an implicit or explicit indication in the transmission itself. Such indications may include, for example, a property of a reference signal mapped to resources within a given BTI, which may indicate whether the transmission ends at the end of the BTI (or group of BTIs) or continues for at least one additional BTI (or group of BTIs); a property of a reference signal mapped to resources within a given BTI (or BTI group), which may indicate that a new transmission starts (or ends) at the beginning (or end) of this BTI (or BTI group); a property of a reference signal mapped to resources within a given BTI, which may indicate the duration or remaining duration of the transmission; or downlink control information multiplexed with data in the same physical channel.

In one example of downlink control information multiplexed with data in the same physical channel, an indication may be concatenated to each code block (e.g., at the beginning or at the end of the code block) of the transmission. The indication may be jointly encoded with or separately encoded from the data in each code block. The indication may also be used to mask the cyclic redundancy check appended at the end of each code block. The WTRU may determine that the code block was decoded successfully and whether the transmission continues for a duration corresponding to at least one subsequent code block by checking the value of the indication, or by determining the value of the indication which results in successful CRC after masking. The WTRU may interrupt decoding of the transmission in a case where the code block cannot be decoded successfully, or in a case where the code block is decoded successfully but the indication indicates that the transmission ends.

One or more timing parameters may be determined from the SOM associated with the transmission. For example, the duration of a transmission associated with a first SOM (e.g., suitable for ultra-low latency) may be 1 BTI, whereas the duration of a transmission associated with a second SOM (e.g., suitable for mobile broadband) may be 2 BTIs.

The WTRU operating in a wireless communications system such as a 5gFLEX system may be configured to determine the frame timing and/or the system frame number in accordance with another embodiment, which may be used in combination with any of the embodiments described herein. Acquisition of the frame timing may be used to not only receive signals from an associated node (eNB or other WTRU), but also for transmission (e.g., so that the other node may receive the transmission properly). Under the context of a variable frame structure described herein and with the desire to reduce the common control channels to a minimum, it may be challenging or undesirable to continuously provide periodic synchronization signals for frame timing acquisition.

Acquisition of the frame timing and system frame number is described further in the following in the context of a WTRU that is connected to an eNB or is in the process of connecting to an eNB. However, these techniques may also be applicable for any types of nodes (WTRU, eNB, relays, access point, etc.). In the following, the term "synchronization source" may be used to describe a node that is used as a reference for determining synchronization. This synchronization source may be, for example, an eNB, a WTRU, an access point, base station, a special device, a roadside unit, etc.

A WTRU or node acquiring frame timing may be configured to monitor one or more common reference signals from one or more synchronization sources.

The reference signal may include a special preamble that is transmitted by the synchronization source (e.g., eNB). The WTRU may determine that the preamble may be used for determining the frame timing based on the characteristics of the preamble signal. For convenience such a special preamble may be referred to herein as a synchronization preamble.

The WTRU may be configured to receive one or more preamble signals. Upon reception of a preamble, the WTRU may determine whether or not the received preamble is a synchronization preamble (e.g., based on the preamble characteristics, for example in the case of a Zadoff-Chu sequence the root, cyclic prefix or a combination thereof). Upon detection of a synchronization preamble, the WTRU may be configured to adjust its internal timing according to the received synchronization signals. The WTRU may further use the preamble for channel estimation, e.g., in order to assist in signal detection of ensuing control/data information contained in the subframe.

The WTRU may be configured to receive special synchronization messages. These messages may carry one or more of a synchronization signal, absolute time reference, system frame number, or time offset.

A synchronization signal or code may include a special sequence of bits (e.g., Zadoff-Chu, gold code, etc.) that may be multiplexed with the payload and may be used as a synchronization reference.

An absolute time reference (e.g., UTC) or truncated absolute time reference may include, for example, the synchronization message that may carry a full or partial absolute time (system time). In one particular example, the message may include the UTC time. The WTRU may then derive the absolute time, for example with respect to the time at which it received the message (and not the time at which it decoded it).

A system frame number may be included in the synchronization message, which may carry the system frame number in full, or partially.

A time offset may be included in the message, which may carry a time offset that the WTRU may apply to its internal clock. This may be motivated, for example, to bias the WTRU internal clock so that some procedures in the WTRU that rely on time may use a different time value than neighbor WTRUs (enabling an interference averaging interference mitigation technique).

The WTRU may determine the system frame number based on absolute time. For example, this may be achieved by truncating the most significant bits of the absolute time counter. In such cases, the system frame number may not need to be transmitted explicitly. This approach may be advantageous for many aspects, including higher layer security, which may now rely on an absolute and common known count value.

The synchronization message may be common or dedicated. Common synchronization messages may be transmitted or scheduled using a broadcast channel.

A synchronization message may be transmitted periodically by a node (e.g., a WTRU or an eNB). To reduce overhead, the synchronization message may be transmitted with a very low duty cycle. For example, the node transmitting the synchronization message may be configured to transmit the synchronization message at a set of specific (e.g., pre-configured) absolute time instants (e.g., expressed in UTC time). The WTRU (or the synchronizing device)

may be configured to tune-in with a listening window sufficiently long to capture the synchronization message. In one example, the WTRU determines its listening window based on the amount of time since it acquired absolute time and based on an estimated time drift of its internal hardware clock.

The WTRU may determine the schedule of the synchronization message via assistance from neighbor nodes/cells. This may be used, for example, in a case where there is no pre-configured time instant for the transmission of the synchronization message or where it is unavailable (e.g., when roaming to another network as determined by the PLMN or geographical location). More specifically, the WTRU may receive information on the synchronization message schedule of one or more synchronization sources from the node it is connected to. In one example, the WTRU may request/obtain synchronization source information from the network (e.g., via a node to which it is connected or via another RAT (e.g., LTE, HSPA, etc.)).

The synchronization message schedule may be expressed in terms of absolute time (e.g., UTC time), or relative to the system/node time to which the WTRU is connected (e.g., different RAT, or other).

The WTRU may be configured to acquire the frame timing by requesting the synchronization from the synchronization source node. This approach may be motivated for example in the case where the synchronization source node (e.g., an eNB) is a low-power cell or node that is inactive, or is turned off.

The WTRU may be configured to transmit one or more synchronization request messages or signals during a pre-defined time window. The preconfigured time window may be expressed relative to the UTC time, which the WTRU may have acquired at a previous time instant. For example, a WTRU may have acquired frame synchronization and may keep maintaining the synchronization via its internal clock. Due to clock drift, it may be expected that the WTRU will eventually become unaligned in time with the UTC time or system time and thus, provided the synchronization source node has a sufficiently wide listening window, the synchronization request message may be received appropriately.

The WTRU may be configured to transmit a synchronization request signal periodically, and upon reception of this synchronization signal, the synchronization source may respond with a synchronization message. This approach may be motivated by energy efficient operations.

The WTRU may be configured to periodically send a synchronization request message to the synchronization node if it has not received a synchronization message during a preconfigured amount of time. This amount of time may depend for example on the WTRU's capabilities and may thus vary from one WTRU to the next.

Figure 8:
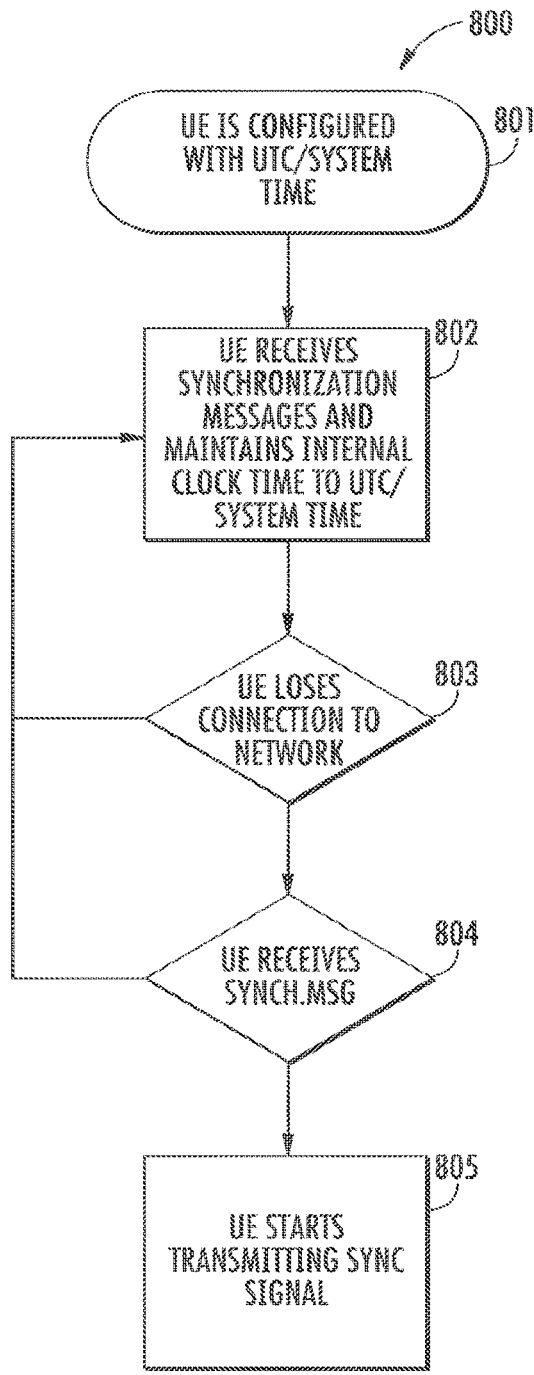
FIG. 8 is a flow diagram of an example process to determine the frame timing and/or the system frame number.

FIG. 8 is a flow diagram of an example process to determine the frame timing and/or the system frame number 800 in accordance with this embodiment, which may be used in combination with any of the embodiments described herein. A WTRU may first receive or acquire UTC/system time and/or frame timing clock via configuration 801 (e.g., connection to an external source via wired (e.g., USB) or wireless (e.g., GPS)). The WTRU may receive synchronization messages and re-acquire and maintain its UTC/system time 802 and/or frame timing clock according to the network pre-configured synchronization message schedule. The WTRU may determine its frame timing based on a received value of the synchronization message. The WTRU may temporarily power off its transceiver, receiver, or transmitter and/or lose its coverage with the network 803. The WTRU may maintain its internal UTC clock 802 and/or frame timing clock. The WTRU may then attempt to reacquire the frame timing upon powering on its transceiver, receiver, or transmitter or attempt synchronization acquisition based on the pre-configured time window for transmission of the synchronization message. If the WTRU does not receive the synchronization message 804, the WTRU may be configured to transmit a synchronization signal 805 and keep monitoring for a synchronization message from the downlink. Such monitoring may be continuous as shown in FIG. 8.

Figure 9:
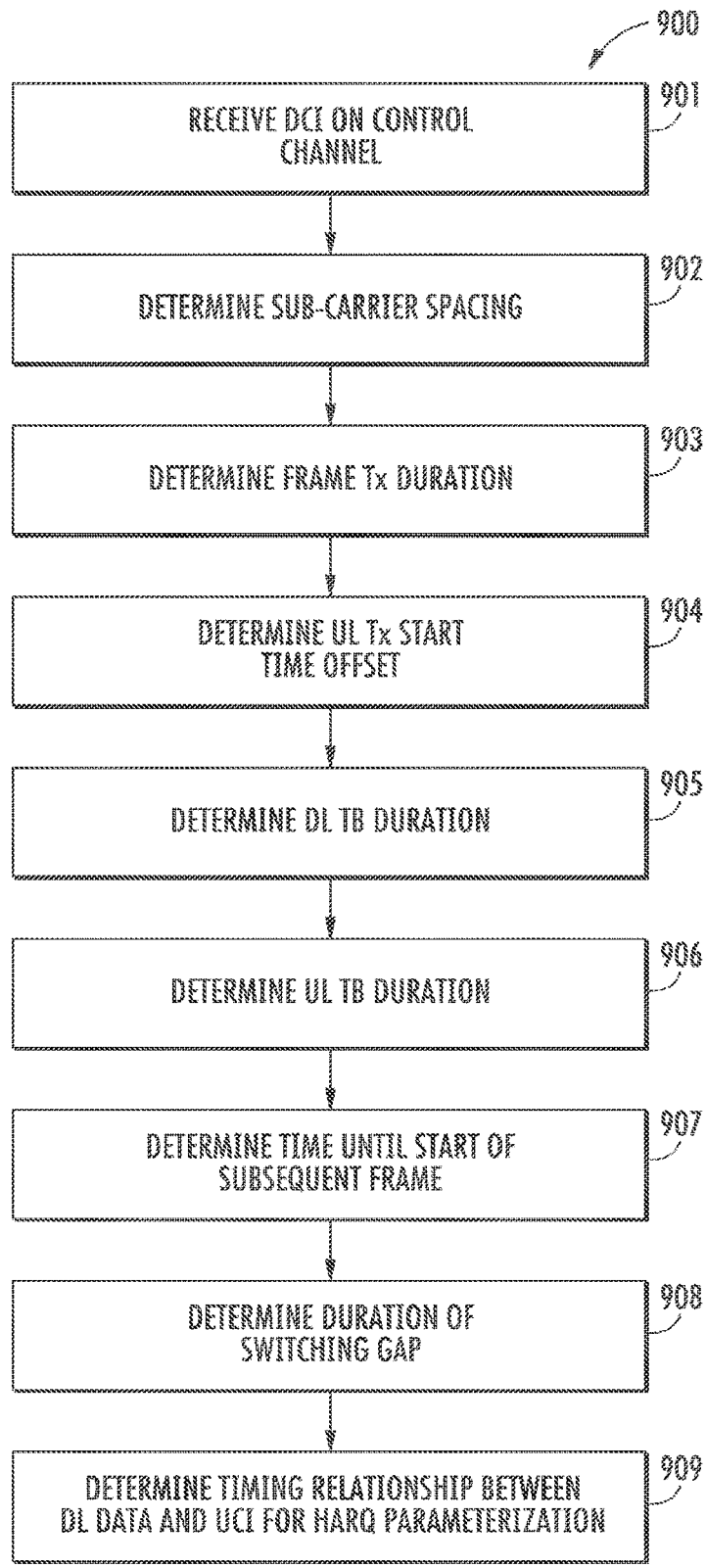
FIG. 9 is a flow diagram of an example transmission control and scheduling process.

FIG. 9 is a flow diagram of an example transmission control and scheduling process 900 in accordance with one embodiment, which may be used in combination with any of the embodiments described herein. The WTRU may receive a DCI 901 on a control channel such as the PDCCH. The received DCI 901 may include DCI characteristics including but not limited to the following: associated control channel, search space, RNTI used to decode the DCI, a demodulation signal or the like. Such a DCI 901 may be the DCI that allocates physical layer resources for the concerned transmission. Alternatively, it may be a DCI dedicated to the scheduling of timing and/or framing parameters associated with the applicable physical layer resources (e.g., a SOM).

The WTRU may then determine a sub-carrier spacing $\Delta f$ 902 applicable to the transmission based on one or more of the characteristics of the DCI identified above. For asynchronous operation, the sub-carrier spacing may be based on a property of a preamble associated with the start of the frame. For example, the WTRU may determine a sub-carrier spacing applicable to the transmission based on an indication received in the DCI. In another example, the subcarrier spacing may be for an uplink transmission. The WTRU may then determine a BTI associated to the transmission from the associated sub-carrier spacing.

The WTRU may then determine the total frame transmission duration e.g., $TTI_{DL(n)}$ (e.g., for FDD) or $TTI(n)$ (e.g., for TDD) 903 applicable to the transmission based on one or more of the characteristics of the DCI identified above. The duration of a TTI may be in terms of BTI(s), symbol(s) or the like. For of asynchronous operation, the frame transmission duration may be based on a property of a preamble associated with the start of the frame. For FDD, the duration of the TTI may be equal to the duration of the downlink transmission DL_TRx associated with frame n when a single TB is transmitted per TTI (e.g., after having first excluded the DCI duration if applicable); otherwise, the duration of the TTI may be used to further determine the duration of a plurality of DL_TRx for frame n, e.g., by dividing the TTI length by the number of applicable transmissions in the frame or by combining with knowledge of the duration of other DL_TRx portions for the frame or similar. For example, if the total duration of the frame (or of the entire DL portion) is known, and if the duration of all DL TTIs is known in the frame or DL portion except for one, the duration of the remaining DL TTI may be determined. For TDD, the duration of the TTI may be equal to the duration of the downlink transmission DL_TRx, the switching gap (SWG), and the uplink transmission UL_TRx associated with frame n when at most a single TB is transmitted per UL or DL portion of the framing arrangement; otherwise the duration of the TTI may be determined in a method similar to the case for FDD. Multiple DL_TRx portions and/or UL_TRx portions may be supported. For example, the WTRU may determine such duration applicable to the transmission based on an indication received in the DCI.

The WTRU may then determine an uplink transmission start time offset (e.g., $t_{offset}$) 904 based on one or more of the characteristics of the DCI identified above. For asynchronous operation, the transmission start time may be based on a property of a preamble associated with the start of the frame. For FDD, if multiple UL_TRx portions are supported, the WTRU may determine a single offset applicable to the first uplink portion if all uplink portions are in consecutive symbols for the concerned frame, or it may determine one offset for each portion otherwise. For example, the WTRU may determine one or more transmission start time offset(s) applicable to the transmission based on an indication received in the DCI.

The WTRU may then determine a downlink TB duration e.g., $t_{DL(n)}$ 905 applicable to the transmission based on one or more of the characteristics of the DCI identified above. For asynchronous operation, the downlink TB duration may be based on a property of a preamble associated with the start of the frame. If multiple DL_TRx portions are supported, the WTRU may determine one value $t_{DL(n)}$ for all portions if all have the same duration within the frame (e.g., for a bundling-like operation) or one value for each portion otherwise. For example, the WTRU may determine one or more downlink TB duration(s) applicable to the transmission based on an indication received in the DCI.

The WTRU may then determine an uplink TB duration e.g., $t_{UL(n)}$ 906 applicable to the transmission based on one or more of the characteristics of the DCI identified above. For asynchronous operation, the uplink TB duration may be based on a property of a preamble associated with the start of the frame. If multiple UL_TRx portions are supported the WTRU may determine one value $t_{UL(n)}$ for all portions if all have the same duration within the frame (e.g., for bundling-like operation) or one value for each portion otherwise. For example, the WTRU may determine one or more uplink TB duration(s) applicable to the transmission based on an indication received in the DCI.

The WTRU may then determine a time until the start of a subsequent frame (e.g., an inter-frame time such as an ISS applicable from the end of the associated frame) 907 based on one or more of the characteristics of the DCI identified above. For asynchronous operation, the time until the start of a subsequent frame may be based on a property of a preamble associated with the start of the frame. For example, the WTRU may determine a time until the start of a subsequent frame, such as an offset from the start of the current frame. Such offset may be used by the WTRU to determine whether or not it may refrain from decoding control signaling until the start of the subsequent frame (e.g., apply DRX to the concerned control channel). For example, the WTRU may determine such a time until the start of a subsequent frame based on an indication received in the DCI.

The WTRU may then determine the duration of a switching gap (SWG) (and/or a silent/blank period) 908 applicable to the current frame based on one or more of the characteristics of the DCI identified above. For asynchronous operation, the duration of the switching gap may be based on a property of a preamble associated with the start of the frame. For example, the WTRU may determine such a gap and/or period based on an indication received in the DCI.

The WTRU may then determine a timing relationship between DL data and UCI applicable to the received DL TRx portion 909 for HARQ parameterization based on one or more of the characteristics of the DCI identified above. The WTRU may derive in which UL TRx portion and/or in which frame and/or which transmission parameters it may transmit DL HARQ feedback corresponding to the received DL data to the eNB. The WTRU may determine from the received HARQ parameterization if it may aggregate HARQ feedback of one or multiple received DL data channels for the purpose of generating UL Control Information. The WTRU may derive the timing relationship between transmission of UL data in one or more UL TRx portion(s) and reception of DL Control Information, aggregation of DL Control Information corresponding to multiple received UL Data channels and encoding parameters used.

Figure 10:
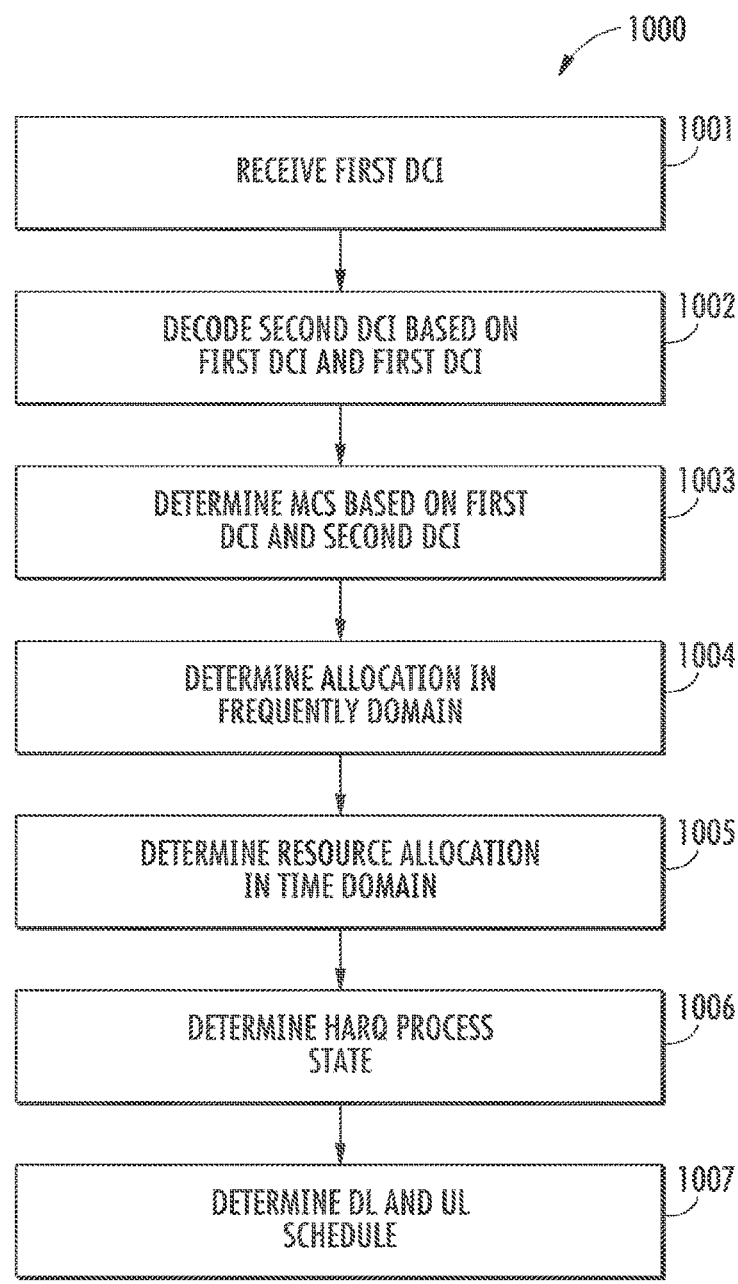
FIG. 10 is a flow diagram of an example link adaptation and scheduling process.

FIG. 10 is a flow diagram of an example link adaptation and scheduling process 1000 in accordance with one embodiment, which may be used in combination with any of the embodiments described herein. A WTRU may determine parameters for downlink and uplink transmissions for use in link adaptation and other transmission control aspects. Link adaptation and scheduling may be time period-based. For example, referring to FIG. 10, the WTRU may receive 1001 at least one transmission parameter for an uplink or downlink transmission that may be a function of explicit or implicit indications received from more than one instance of downlink control signaling.

The more than one instance received 1001 may, for example, include a first instance and/or a second instance, such as a first DCI and a second DCI, respectively. The first instance (e.g. DCI) may indicate at least one parameter applicable to a set of transmissions occurring over a subsequent time period. For example, such a time period may be of a duration equal to a 1 ms subframe, which may for example correspond to one LTE subframe (1 ms). Such a first instance may be referred to as "slow" downlink control signaling. The second instance (e.g. a second DCI) may indicate additional parameters applicable to a specific transmission of the set within the time period. Such a second instance may be referred to as "fast" downlink control signaling. The downlink control signaling applicable for each instance may be decoded from different types of physical downlink control channels, possibly in different search spaces and using different identifiers.

Referring to FIG. 10, the WTRU may decode the second instance (e.g. a second DCI) of the downlink control signaling 1002 based on explicit information obtained from the first instance (e.g. a first DCI) of the downlink control signaling, and/or based on implicit information obtained from a property of the transmission containing the first instance of the downlink control signaling. For example, the resource or set of possible resources for the second instance of downlink control signaling may be determined from the resource used for the first instance of downlink control signaling, and/or at least one explicit indication obtained from the first instance of downlink control signaling. A resource may include at least one of a set of resource blocks, a serving cell (or carrier), a set of time symbols, a set of antenna ports, a scrambling identity for reference signal or a control channel element (CCE), such as the first CCE associated with the first instance of the downlink control signaling. Alternatively, the downlink control signaling may be multiplexed with data in the same physical channel in the case of a downlink transmission. For example, the second instance (e.g. a second DCI) of downlink control signaling may be encoded separately from downlink data, and the modulated symbols from downlink control signaling may be mapped on specific time or frequency resources, such as in the first time symbol of the transmission.

The WTRU may perform additional examples of period-based link adaptation and scheduling. For example, referring to FIG. 10, the WTRU may determine the MCS 1003 applicable to a downlink or uplink transmission. The WTRU may determine the MCS 1003 using several methods. For example, WTRU may determine the MCS 1003 by determining the sum of a first MCS value received in a first instance (e.g. a first DCI) and a second MCS value received the second instance (e.g. a second DCI). The number of possible values may be higher for the first instance (e.g. a first DCI) than for the second instance (e.g. a second DCI), allowing overhead reduction for control signaling applicable to a specific transmission. For example, the first instance (e.g. a first DCI) may indicate a value ranging from 0 to 31, while the second instance (e.g. a second DCI) may indicate an adjustment value ranging from −2 to 1. Alternatively, there may be no parameter related to MCS provided in the second instance (e.g. a second DCI), with the result that the same MCS value is applied to all transmissions within the period. The WTRU may determine the MCS 1003 applicable to a downlink transmission by performing an adjustment to the MCS after reception of each code block (or each transport block) based on an indication. The indication may be concatenated to each code block (e.g., at the beginning or at the end of the code block) of the transmission or to each transport block. The indication may be jointly encoded with, or separately encoded from the data in each code block. The indication may also be used to mask the CRC appended at the end of each code block (or transport block). The WTRU may determine an adjustment to the MCS level applied to a subsequent code block (or transport block) based on the value of the indication. The adjustment may be relative to the MCS value received in the first instance of downlink control information, or relative to the last adjusted MCS value.

Referring to FIG. 10, the WTRU may determine the allocation in the frequency domain 1004 (e.g., set of resource blocks) by combining an indication received in a first instance (e.g. a first DCI) with an indication received in a second instance (e.g. a second DCI). For example, the indication of the first instance (e.g. a first DCI) may consist of the complete set of resource blocks that may be used by the applicable transmissions of the period. Such indication may have a high granularity (e.g., 20 bits). The indication of the second instance (e.g. a second DCI) may indicate a subset of the allocation indicated by the first instance (e.g. a first DCI) using a low number of bits for a specific transmission. For example, a first value may indicate that all resource blocks are used for a specific transmission, a second value may indicate that only the first half of the allocation is used, a third value may indicate that only the second half of the allocation is used, and so on. It is also possible that no indication is provided in the second instance, such that the same allocation is used for all transmissions within the period.

Referring to FIG. 10, the WTRU may determine the resource allocation in the time domain 1005 (e.g. a set of time symbols and/or timing) of a transmission by combining an explicit indication received in a first instance (e.g. a first DCI) with an implicit indication from successful decoding of a second instance (e.g. a second DCI). The first instance may refer to or indicate multiple sets of one or more time symbols where the second instance of downlink control signaling and/or data (in case of downlink transmission) may be transmitted. For example, the first instance (e.g. a first DCI) may indicate a first set of time symbols (e.g. from the second to the seventh) and a second set of time symbols (e.g. from the eighth to the fourteenth) of an LTE subframe. The WTRU may attempt to decode a second instance (e.g. a second DCI) of downlink control signaling in specific resources (or search space) within each set of time symbols. The WTRU may determine that a second instance (e.g. a second DCI) of downlink control signaling is decoded successfully based on a cyclic redundancy check (CRC) appended to the payload. The WTRU may then determine the timing of the downlink or uplink transmission based on the set of time symbols within which the second instance (e.g. a second DCI) of downlink signaling was successfully decoded. For example, in a case where the second instance (e.g. a second DCI) was successfully decoded in the eighth time symbol, the WTRU may determine that the downlink transmission is allocated within the second set of time symbols. In another example, the WTRU may be configured with the applicable sets of time symbols for a given frame, e.g. an LTE subframe. The first instance (e.g. a first DCI) may indicate for which set the WTRU is expected to perform further processing of DCI in a manner similar to the above.

Referring to FIG. 10, the WTRU may determine a further HARQ process state as a function of such above indication in the first instance (e.g. a first DCI) of the downlink control signaling 1006. Each set of symbols may be further associated with a HARQ process identification space, for example, where a single HARQ process may be active per frame, such as per LTE subframe, for each such space and/or set of symbols. Alternatively, each set of symbols may be further associated with a HARQ process identifier, for example, such as an identifier that increases for each set of symbols starting from the first symbol of a frame and onwards. In other words, the HARQ process identifier may increase sequentially with time for each set of symbols. For example, the WTRU may receive HARQ feedback for one or more previous uplink transmissions, e.g., using the Physical HARQ Indicator Channel (PHICH) in LTE. Such feedback may be received according to the slow control information timing, e.g., once per frame, e.g., 1 ms subframe of LTE. The WTRU may use such feedback to determine whether or not it may perform WTRU autonomous retransmissions for applicable HARQ processes, e.g., if the WTRU is configured to perform such retransmissions. For example, in LTE, the WTRU may perform autonomous retransmissions as per its synchronous HARQ processing in the uplink. In other words, the WTRU may interpret such feedback as an indication to enable or disable WTRU autonomous transmissions for the concerned HARQ processes. Such a HARQ state may be further determined as a function of an indication in the first instance. For example, if WTRU autonomous retransmissions are enabled, such a determination may correspond to an order to suspend one or more of the concerned HARQ process(es) and/or to refrain from performing any WTRU autonomous retransmissions e.g., where the WTRU determines that it is not expected to perform further processing for the associated set of symbols. Alternatively, the WTRU may interpret PHICH as per legacy WTRU behavior and perform a logical function (e.g., a logical AND) with such set indication in the first instance of the downlink control signaling. For example, such control signaling may include one bit for each set of symbols further indicating HARQ-related feedback for each HARQ process in the frame e.g., in the LTE subframe in addition to indicating whether (adaptive retransmission, if applicable) or not (non-adaptive retransmission, if applicable) the WTRU is expected to perform further processing of downlink control information in a manner similar to the above.

Referring to FIG. 10, the WTRU may determine that a downlink or uplink transmission is scheduled for that WTRU 1007 if a certain set of identity parameters are indicated in (or used for the decoding of) the first and second instances (e.g. first and second DCI) of downlink control signaling. The same parameter (e.g., a Cell-Radio Network Temporary Identifier (C-RNTI)) may be used to mask the CRC's appended to the payloads of the first and second instances (e.g. first and second DCI).

The first and second identity parameters of the first and second instances (e.g. first and second DCI) respectively may be derived as functions of the same C-RNTI and used to mask to CRCs appended to the payload of the first and second instances. For example, the first identity parameter may correspond to an RNTI value assigned or defined for operation with two instances of downlink control signaling, while the second identity parameter may correspond to a C-RNTI or a function thereof. In this example, the first instance of downlink control signaling (e.g. first DCI) may also indicate a set of short identities corresponding to WTRUs that may be scheduled in the period. The short identity may be a function or hash of, or otherwise based on the C-RNTI, or may be assigned by a higher layer. The WTRU may determine that a downlink or uplink transmission is scheduled if it was indicated by its short identity from the first instance (e.g. first DCI), itself decoded using the first identity, and successfully decoded the second instance (e.g. second DCI) using its second identity.

In another example, a second identity parameter may be obtained using an explicit indication from the first instance (e.g. first DCI) of downlink control signaling. The second identity parameter may be used for the decoding of the second instance (e.g. second DCI) of downlink control signaling. For example, it could be included in the payload or used to mask a cyclic redundancy check (CRC) appended to the payload.

In another example, the first instance (e.g. first DCI) of downlink control signaling may contain an ordered set of identity parameters (such as C-RNTI, or function thereof) indicating a set of WTRUs which may receive a second instance (e.g. second DCI) of downlink control signaling over the applicable time period. The WTRU may derive the second identity parameter based on the order of its identity within the set of identity parameters indicated in the first instance (e.g. first DCI).

One or more of the following parameters applicable to a downlink or uplink transmission may be obtained from the first (slow) instance (e.g. first DCI) of downlink control signaling using the link adaptation and scheduling process 1000 of FIG. 10:

An indication of a resource or a set of possible resources for the transmission and/or for the second (fast) instance (e.g. second DCI) of downlink control signaling applicable to the transmission (such as an indication of a set of resource blocks or an indication of a time-domain structure where a structure includes a set of possible initial and final time symbols for a transmission); a carrier indicator; a modulation and coding scheme; a rank; a set of antenna ports; an indication of at least one reference signal to use as timing reference and/or demodulation reference; and/or a power control command.

One or more of the following parameters applicable to the same downlink or uplink transmission may be obtained from the second (fast) instance (e.g. second DCI) of downlink control signaling:

A HARQ process identity applicable to the downlink or uplink transmission; a retransmission sequence number and/or redundancy version; an indication of whether the transmission is a retransmission or new data (or initial transmission); HARQ feedback information (e.g., PHICH or a value which may be logically combined with the PHICH received for the concerned time period (e.g., a LTE subframe)); an indication of a parameter applicable to at least one reference signal, such as at least one cyclic shift index (e.g., for uplink transmission), an indication related to operation in unlicensed bands, such as a request to provide information on whether the channel is busy or not (e.g., clear channel assessment); and/or an indication of a resource for control signaling which provides HARQ-related feedback for this transmission (e.g., HARQ-ACK on PUCCH for a downlink transmission, PHICH for an uplink transmission).

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, eNB, RNC, or any host computer.

What is claimed is:

1. A method for use in a wireless transmit/receive unit (WTRU), the method comprising:
   receiving, from a first network node using a first radio access technology (RAT), an indication of periodic transmissions of a signal including synchronization signals from a second network node using a second RAT, wherein the indication of periodic transmissions corresponds to a system time of the first network node;
   determining, from the received signal including the synchronization signals, an indication of a frame timing associated with the second network node; and
   receiving, from the second network node, the signal including the synchronization signals based on the indication of the periodic transmissions.

2. The method of claim 1, wherein the frame timing associated with the second network node is within a preconfigured time window.

3. The method of claim 1, wherein the first RAT is a Long Term Evolution (LTE) RAT and the second RAT is a fifth generation (5G) RAT.

4. The method of claim 1, wherein the first network node is an eNodeB and the second network node is a gNB.

5. A wireless transmit/receive unit (WTRU) comprising:
   a transceiver; and
   a processor,
   the transceiver and the processor configured to:
   receive, from a first network node using a first radio access technology (RAT), an indication of periodic transmissions of a signal including synchronization signals from a second network node using a second RAT, wherein the indication of periodic transmissions corresponds to a system time of the first network node;
   determine, from the received signal including the synchronization signal, an indication of a frame timing associated with the second network node; and receive, from the second network node, the signal including the synchronization signals based on the indication of the periodic transmissions.

6. The WTRU of claim 5, wherein the frame timing associated with the second network node is within a preconfigured time window.

7. The WTRU of claim 5, wherein the first RAT is a Long Term Evolution (LTE) RAT and the second RAT is a fifth generation (5G) RAT.

8. The WTRU of claim 5, wherein the first network node is an eNodeB and the second network node is a gNB.

* * * * *